Feb. 7, 1967 H. L. WIRSING 3,303,288

REGISTER-SENDER ARRANGEMENT

Filed Nov. 26, 1963 14 Sheets-Sheet 1

INVENTOR.
Howard L. Wirsing

BY

C. A. Gulbransen

ATTY.

Feb. 7, 1967 H. L. WIRSING 3,303,288

REGISTER-SENDER ARRANGEMENT

Filed Nov. 26, 1963 14 Sheets-Sheet 3

Feb. 7, 1967 H. L. WIRSING 3,303,288

REGISTER-SENDER ARRANGEMENT

Filed Nov. 26, 1963

14 Sheets-Sheet 9

Feb. 7, 1967 H. L. WIRSING 3,303,288

REGISTER-SENDER ARRANGEMENT

Filed Nov. 26, 1963 14 Sheets-Sheet 10

1

3,303,288

REGISTER-SENDER ARRANGEMENT

Howard L. Wirsing, Chicago, Ill., assignor to Automatic Electric Laboratories, Inc., Northlake, Ill., a corporation of Delaware Filed Nov. 26, 1963, Ser. No. 325,870

12 Claims. (Cl. 179—18)

This invention relates to a register-sender arrangement, and more particularly to an arrangement for a register-sender-translator communication switching system to control switching instructions and processing digits for completing a call.

The principal object of this invention is the provision of an arrangement to provide a sequence of operations for selecting and transferring switching and processing instructions from the register to the sender, and to inform the sender of the required mode of sending for establishing a connection to the called line.

Another object of this invention is to provide an arrangement to modify the selection of switching information and the mode of sending in response to an alternate route situation occurring, where an alternative connection to the called line is necessary.

According to the invention, a unit connecting the registers and senders is provided with bistable devices which designate special sequence states to supervise the transmission of switching and processing instructions from the register to the sender. There are basically four types of sequence states: switching-digit states, end-of-send states, mode-digit states, and skip-digit states. These four states correspond to the four types of information received from the common translator to the memory storage area in the register for the terminating portion of a call. During a switching-digit state the switching digits stored in the memory are transferred to the sender. These digits are selectively transferred to the sender until an end-of-send state is reached which corresponds to the end-of-send digit received from the translator; whereupon the sender finishes sending digits to a marker for the switching stages. During a mode-digit state the mode digit may cause a logic signal to be generated designating a change in the mode of sending which thereby causes the sender to change its mode of sending. During a skip-digit state a group of switching digits necessary to establish a connection to the called line is selected which is designated by the skip digit.

Further according to the invention, the mode digit can be modified in response to an alternate route signal received from the marker associated with the switching stages via the sender, thereby changing the mode of sending for an alternate route. The skip digit may also be modified in response to the receipt of the same alternate route digit to thereby select another group of switching digits which are necessary to establish a connection via the alternate route designated by the alternate route digit.

A pending U.S. patent application by K. E. Prescher et al., for a Register-Sender Arrangement for a Communication Switching System, Control Arrangement, Serial No. 268,385, filed March 27, 1963, covers a time division multiplex register arrangement in which a large amount of storage is obtained for each register by providing several rows per register in the memory, and by dividing the time slot of each register into several subtime slots. Dividing the storage requirements of a register into several rows allows a more efficient use of the memory drive and sense circuitry and the other electronic apparatus of a register group.

Another pending U.S. patent application by D. Lee et al., for a Register-Sender Arrangement for a Communication Switching System, Common Control Arrangement, Serial No. 308,112, filed September 11, 1963, covers a time division multiplex register arrangement and provides for the detection of the possibility of a reverting call, and also storage for alternate route information, and other related features. These two pending patent applications disclose a register-sender arrangement that can utilize the invention herein described.

2

The above-mentioned and other objects and features of this invention and the manner of attaining them will become more apparent, and the invention itself will be best understood, by reference to the following description of embodiments of the invention taken in conjunction with the accompanying drawings comprising FIGS. 1–16 wherein.

Figures 13, 14, 15:
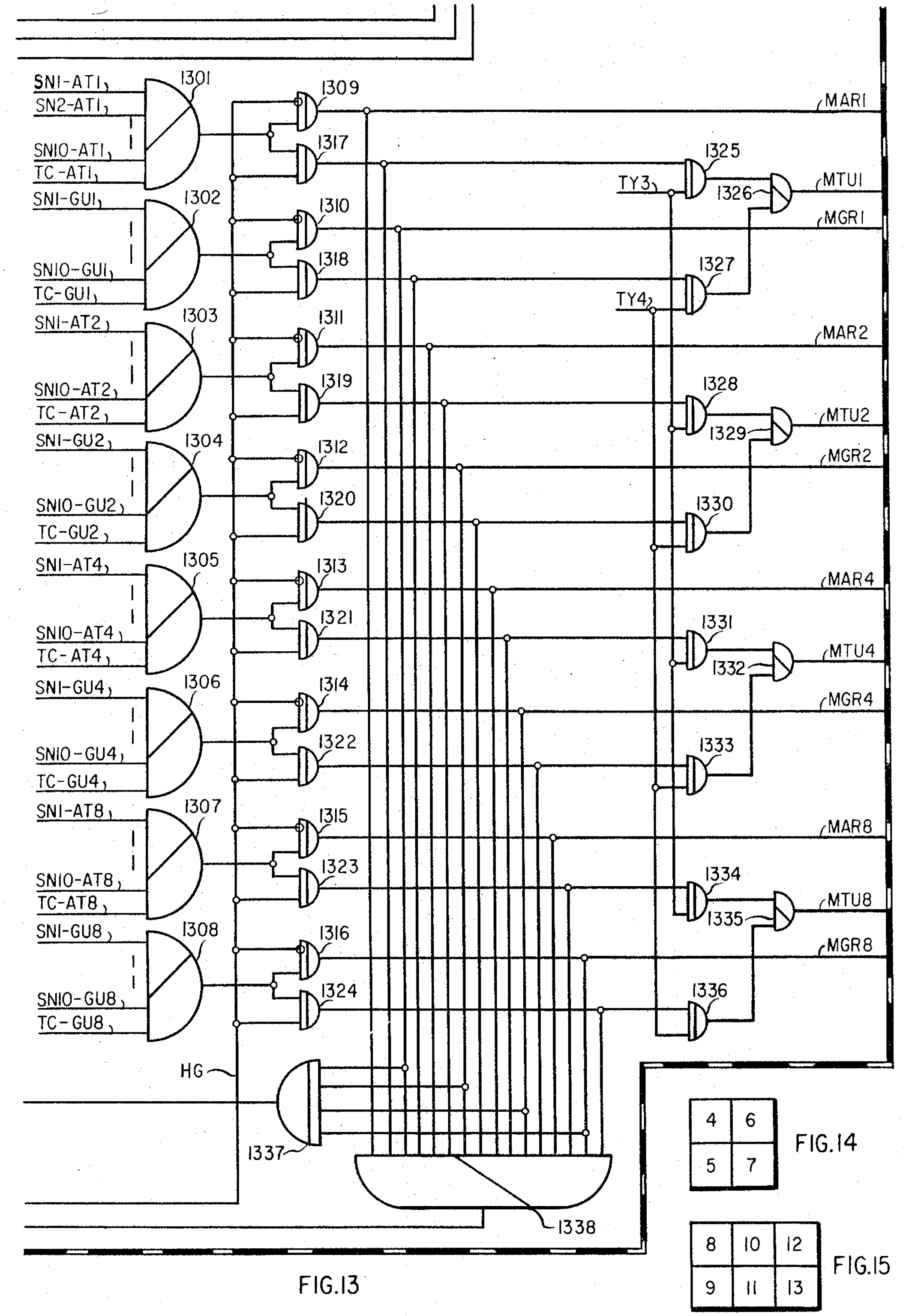
Figure 16:
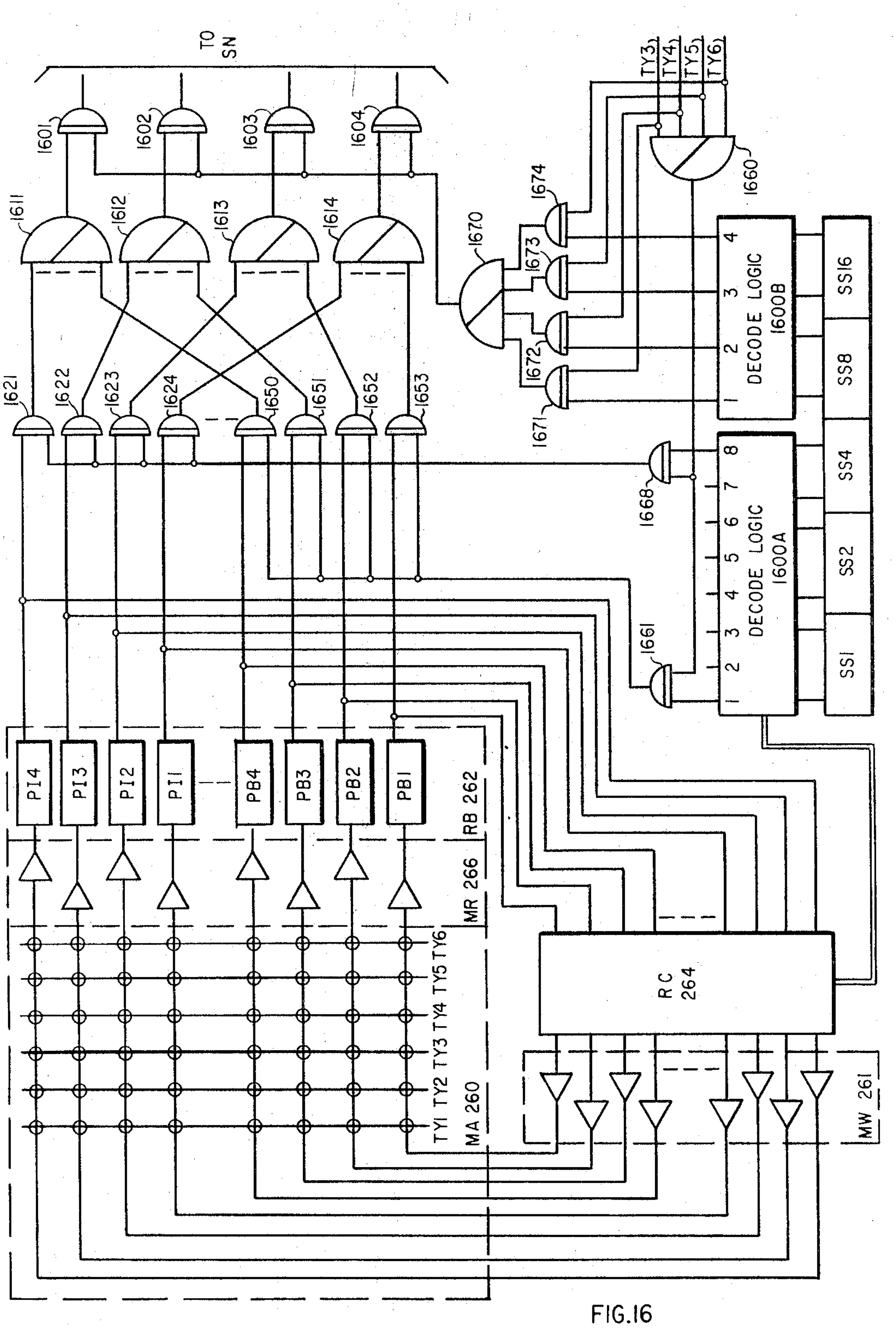

FIGS. 4–7 when arranged as shown in FIG. 15 comprise a simplified symbolic block diagram of the register controller;

FIGS. 8–13 when arranged as shown in FIG. 14 comprise a symbolic block diagram of the sender controller; and FIG. 16 is a simplified symbolic block diagram of an alternative embodiment.

The system is explained according to the following outline:

A. System Organization
B. General Description of the Register-Sender
  (1) Components
  (2) Operation
C. Detailed Description of the Register-Sender Terminating-Call Process Equipment
  (1) Components
    (*a*) Symbolism
    (*b*) Register Controller
    (*c*) Sender Controller
  (2) Operation of a Terminating Call
D. Alternative Embodiment

A. SYSTEM ORGANIZATION

Figure 1:
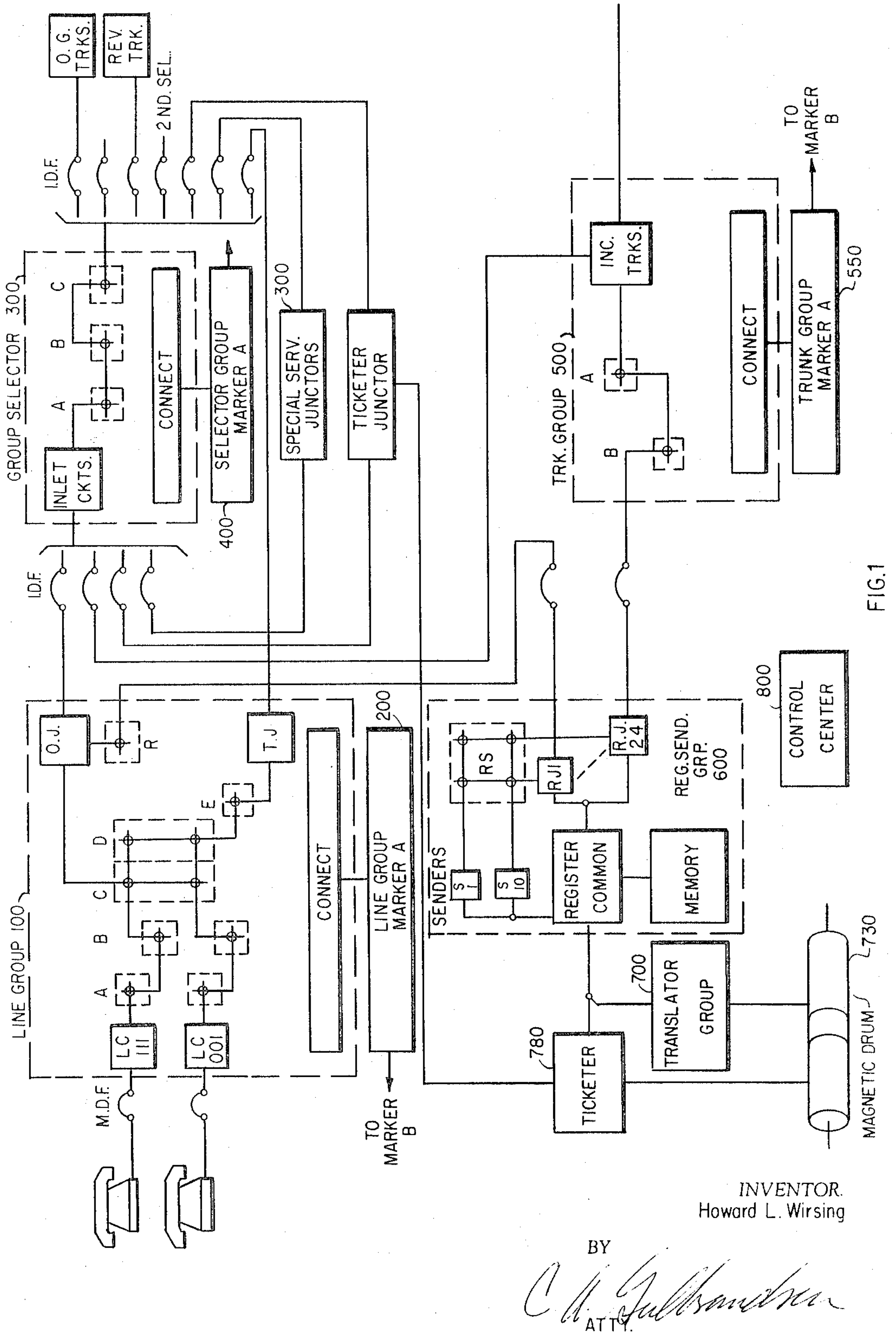
FIG. 1 is a block diagram of a telephone switching exchange.

Referring to FIG. 1, the system consists of the line group 100, group selector 300, register-sender group 600, and the translator 700. There is also a trunk group 500 which provides access from incoming trunks to the registers, and a control center 800 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700 (incuding the magnetic drum 730 and logic circuitry, will always be furnished in pairs per ten thousand directory numbers.

Time division techniques are used in the register-sender group 600 and in the translator 700. The markers are designed on an electronic basis and semiconductor circuitry is employed throughout the system. A ferrite core memory 660 is used for temporary storage whereas the magnetic drum 730 is used for semi-permanent storage.

The sender circuit provides means for transferring information over the voice transmission path from the register-sender to the markers or to distant offices and are claimed in the following pending United States patent application: B. Sherstiuk, A Sender for a Communication Switching System, Serial No. 280,053, filed May 13, 1963.

The space division switching elements of the system consists of reed relay matrix assemblies.

*Control center*

The control center 800 is designed for the purpose of introducing automation into the maintenance administratioin of the switchboard. The control console has direct access to all of the stored system program which is written on the magnetic drum. By means of an electric typewriter, this program may be changed by the maintenance personnel to accomplish quickly, for example, subscriber moves, re-routing of calls to intercept, transfer of a call to another line, absent subscriber service, toll restriction, line busy recording, etc. This method of operation has eliminated the need for an IDF and the labor of changing jumper wires.

The electric typewriter contains a tape punch as well as printer and thus provides a copy of the information written onto the magnetic drum.

*Line group matrix*

This section of the system may be thought of as a large switching unit capable of connecting any one of 1000 lines originating calls to any one of 120 circuits called originating junctors O.J. Likewise, this unit is capable of connecting any one of 120 circuits called terminating junctors 130 and representing incoming calls to any one of the 1000 lines served by this line group. Crosspoint matrices constitute the switching network and provide concentration going outward for originating calls, and expansion going inward for terminating calls. For practical and economic reasons, three stages, A, B, and C make up the outgoing switching stages. Four stages, E, D, B and A, make up the incoming switching stages. The 1000 subscribers lines divided into ten groups of 100 each, are located on the main distributing frame and from there jumpered directly to the A stage. No intermediate distributing frame is required. The A stage has 600 outlets or links (60 for each of the ten "hundreds" group) appearing as inlets to the B stage. The B stage, in turn, has 300 links (30 for each "hundreds" group) appearing as inlets to the C stage. The C stage has 120 links to originating junctors. The originating junctors provide by-paths via the "R" stage to twenty-four registers and also provide access to the inlet circuits of the group selector 300. With this switching configuration, a fully equipped line group is capable of handling a maximum traffic of three unit calls per line in each direction at a grade of service better than .01.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy text, PBX selection, and pathfinding and route selection.

*Group selector matrix*

The intermediate switching functions of the system are performed by a group selector 300. Three stages of crosspoint switches are provided. The first switching stage, the A stage, contains 60 cards of 50 crosspoints, each arranged in a 5 x 10 matrix. This switching matrix is associated with the inlet circuit line and cut-off reed relays to the group selector. The second switching stage, the B stage, contains 60 cards of 60 crosspoints each in a 10 x 6 matrix. The third stage, the C stage, uses a basic arrangement of 60 crosspoints in a 6 x 10 matrix to provide 600 outlets. In addition, a second group of 60 switches may be added to expand the outlet capability of 1200 in case of a very large central office. The group selector has 300 inlets serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker. The marker has control of all crosspoints in the group selector and sets up calls on a one-at-a-time basis. The marker operates in response to selection digits received electronically in its transceiver from the register-sender group. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multifrequency or dial pulse. In this case, the marker will send back instruction regarding digit changes or a command for the sender to change the type of pulsing. If no change is required, the marker can switch the call through to an alternate trunk without changing the sender's instructions.

Insertion junctors shown on the system block diagram at the outlet of the group selector, are used for add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

*Trunk group matrix*

The trunk group 500 provides access for incoming trunks from outside of the office or for special intraoffice trunks such as operator or wire chief. A trunk group matrix is capable of connecting any one of 75 incoming trunks to any one of sixteen registers on a single output level basis. All trunks in the same group of 75 are either dial pulse (DP) or multifrequency (MF). Trunk group matrices are added as required to handle large numbers of incoming trunks. Each matrix is independently controlled but outlets are graded to provide sharing of registers.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

*The register-sender*

The register-sender group 600 is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit comprises time divided circuits which are shared by all twenty-four registers. These circuits are used by each register in turn and are organized to provide the needed registration and process control for the registers. A temporary storage facility is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multifrequency, or code pulse manner.

Communication with the system translators, line group markers, trunk markers, and group selector markers is accomplished by high speed serial transfer of digital information using di-phase.

*The translator*

The translators 700 of the system provide semipermanent storage used by the system to direct the extension of telephone calls in accordance with the subscriber dialed digits.

A pair of translators are provided for each 10,000 directory numbers served by the office. Each translator of the pair shares the traffic load. One of the pair may be taken out of operation for maintenance and all traffic switched to the other without degrading the grade of service. Expansion capability up to 60,000 directory numbers is provided for the office. Information storage is provided by magnetic drums on the basis of one drum per translator.

B. GENERAL DESCRIPTION OF THE REGISTER SENDER

The register sender is a time shared, common control unit with the ability to register and process twenty-four simultaneous calls. The preferred embodiment consists of twenty-four registers and ten senders.

The registers operate in a time division mode. There is one register junctor for every register in the group. Real time to time division entry is provided by the register junctor. Each register consists of two main sections, the first being the common control unit. These time divided circuits are shared by all twenty-four registers. These circuits are used by each register in turn and are organized to provide the needed registration and process control for the registers. The second section consists of a temporary storage facility for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multifrequency, or code pulse manner.

Communication with the system translators, line group markers, trunk markers, and group selector markers is accomplished by high speed serial transfer of digital information using di-phase.

*B(1) Components*

Figure 2:
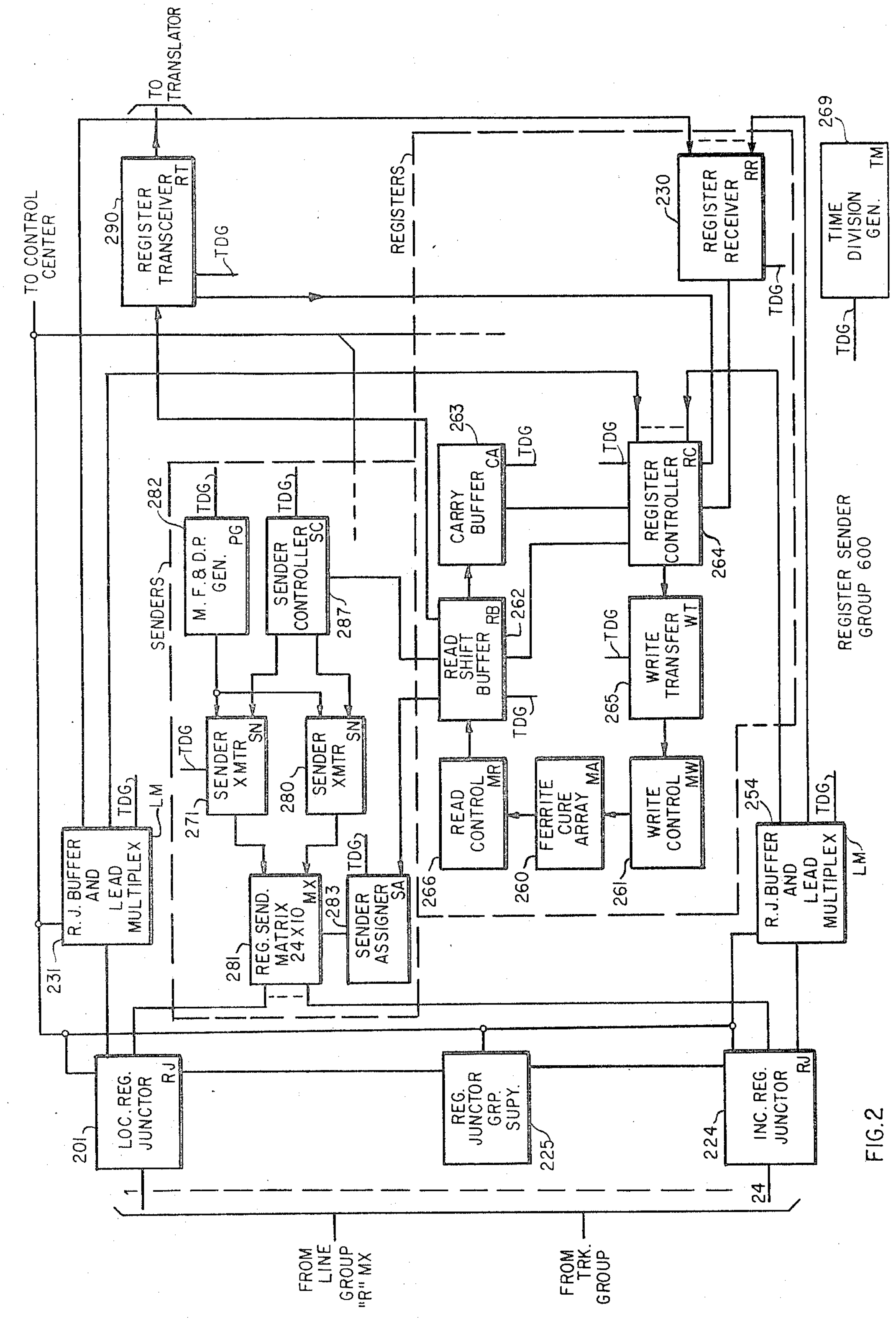
FIG. 2 is a more detailed block diagram of the register sender group.

In order to facilitate understanding the following brief description of each of the circuits within the register sender is given, reference being made to FIG. 2.

The primary function of the register junctor, 201–24, is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for multifrequency and dial pulse.

The sender circuit, 271–80, provides means for transferring information dialed digits or switching instruction over the voice transmission path from the register-sender to the markers or to distant offices. The sender is a universal sender inasmuch as it provides all modes of sending required by the system. Di-phase sending is employed for transmission of switching instructions to the office markers. The di-phase part of the circuit is actually a transceiver since it provides a means of receiving instructions from the markers as well as sending to the markers.

For outgoing calls, the sender provides for both dial pulse and multifrequency signaling. The circuit operates in conjunction with sender controller 270 which is common to all senders in the register sender group. The sender controller supplies the sender with the digits to be sent out and indicates the mode of sending to be employed.

The sender is mainly an electronic circuit except for outgoing loop supervisory equipment where reed relays are used.

The register receiver 230 is seized by the register controller and assigned to serve the register junctor on a hold-til-finished basis. The circuit receives either the line number identification generated by the link markers or the trunk number identification generated by the trunk markers. On seizure of the circuit, a di-phase link is established to the marker being served. When all the digits have arrived in the register receiver, the information is presented to the register controller for storage in the area of the ferrite core array associated with the register being served. Upon completion of this storage process, the register receiver is released for use by the next register requiring service.

The time division generator generates the time slot pulses, sub-time slot pulses, and control pulses that allow the common equipment to operate in a time division mode.

The time slot pulses create a unique time slot for each of the registers in the group. In association with a group of cores in the core array, they allow a true time division multiplex mode of operation.

The sub-time slot pulses allow the use of a folded word memory; wherein each sub-time slot accesses a section of the information stored in those cores accessed by a particular time slot. The control pulses allow the controlled generation of decisions while in a particular sub-time slot.

The register controller 264, operating on a time division multiplex basis, controls the progress of each call being processed. Within a particular time slot, this circuit up-dates the information in storage in the section of the core array associated with the time slot register. This up-dating takes place on a sub-time slot basis and is the result of changes in the information presented since the time slot was served last. All information entering the register sender is available to the register controller for proper arrangement and interpretation.

The memory read 261 and memory write 266 control generates the proper current pulses needed to read and write the cores of the ferrite core array.

The ferrite core array 260 is a sequential access, time slot oriented, temporary storage facility. Each register is assigned a group of cores, which only the time slot with which it is associated can access. This group of cores is accessed in sections by the sub-time slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read shift buffer 262 provides a buffer storage for the memory readout. The read shift buffer is also utilized to shift information, in a particular sub-time slot, from one core position to another. The read shift buffer, by temporarily holding the contents of a section of the memory word, provides a means for this information to be transferred to other circuits within the register sender group.

The carry buffer 263 provides a place where information read from the memory during different sub-time slots can be accumulated until a time is reached, within the time slot, when a decision can be generated on the basis of this information. As a result, by accessing the cores containing the registration and translation control before the time slot is over, an up-dating process is accomplished based on the decisions made during the time slot.

The register transceiver 290 operates as the communication device for information transfer between the register sender group and the system translators. It, like the register receiver, operates on a hold-until-finished basis. This circuit provides two-way di-phase serial communication between the translators and the register sender group. The organization of this circuit is such that the transfer of information from the read shift buffer to the register controller is in a parallel manner. Seizure is dependent on the condition of the control information available in the carry buffer.

The sender controller 270 utilizing information available to it in the read shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read shift buffer under the control of the register controller. The sender controller circuit operates in a time division mode and thus serves all registers during each system cycle.

The sender assigner 283, on request of the register controller, will connect an idle sender to the register junctor requiring service. The connection established by the assigner is the beginning of the terminating switch train, which will be extended by the system switching stages on information received from the sender. The sender assigner operates on a hold-til-finished basis.

*B(2) Operation*

The register sender is a combined local and incoming unit and will handle and process calls of all types of which this call is one of many possibilities.

Upon removal of the handset by the calling subscriber, the line marker identifies the line and searches for an idle register junctor. After finding an idle register junctor, the line marker determines if a path can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be up-dated. As the digits accumulate, they are stored and shifted to their proper location within the register's storage area.

As soon as the first three dialed digits have arrived, a request for the register transceiver is generated and the process digits are coded. The series of digits, called the processing digits, that are contained in the registration and translation control storage area, are given the binary coded decimal values that initiates the translation operation.

This preliminary coding of the process digits will be used by the system translators to select the proper mode of translation. It should be noted that from this point on, in the processing of the call, the register controller will never generate any further coding of the process digits. Each time the system translators return information to the register sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transciever has been written, this unit will be seized as soon as it is available. The three dialed digits, the class of service digits, the process digits, will all be loaded in a parallel manner into the register transceiver, from the read shift buffer. The register transceiver requests the service of an idle system translator and as soon as one is attached transmits this information, via a di-phase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, re-acting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second sub-time slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The markers are presently arranged to send four different instructions to the sender. These instructions are line idle, line busy, trunk busy, and resend. If line idle is encountered, the signal is repeated to the register junctor which signals the originating junctor to switch through the signals and releases the sender.

The recognition of a sender release signal, by the register controller, causes the register controller to extend a disconnect signal to the register junctor and returns the register's storage area to the idle condition.

If line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

C. DETAILED DESCRIPTION OF THE REGISTER SENDER

*C(1) Components*

C(1a) SYMBOLISM

In various parts of the system flip-flops are used as registers. Each of these flip-flops includes two transistors in a bistable circuit configuration. Each flip-flop has eight input terminals and two output terminals. To set a flip-flop to state one, producing a true indication, requires coincidence of a signal on the D.C. input and a trigger pulse on the A.C. input; and in like manner to reset it to state zero, indicating a false condition, requires coincidence of a D.C. input and an A.C. input.

Gated pulse amplifiers are transistor circuits having a direct-coupled gating input terminal and a capacitively-coupled trigger-pulse input terminal. When the two inputs coincide, an output pulse is produced. A typical circuit is shown by R. K. Richards in "Digital Computer Components and Circuits" (D. Van Nostrand Company, Inc., 1957) at page 176.

The logical gates are implemented with NOR gates, each of which is a one transistor logical element whose output can either be considered an AND function of the negations of its inputs, or it can be considered as an OR function of its inputs followed by an inversion. Therefore, the AND gates and the OR gates shown throughout the system are entirely implemented with NOR gates. The electronic units are shown in the drawings as having any number of inputs and output loads, but in actual implementation these would be limited by loading requirements well known in the art.

The inputs to the NOR gates are coupled through individual resistors to the base electrode of the transistor, and the output is taken from the collector electrode. A NOR gate having all of its inputs false produces a true output signal; and if any one of the inputs is true, the output is false. Throughout this system a true signal condition is indicated by a negative potential, and a false condition by ground.

Figure 9:
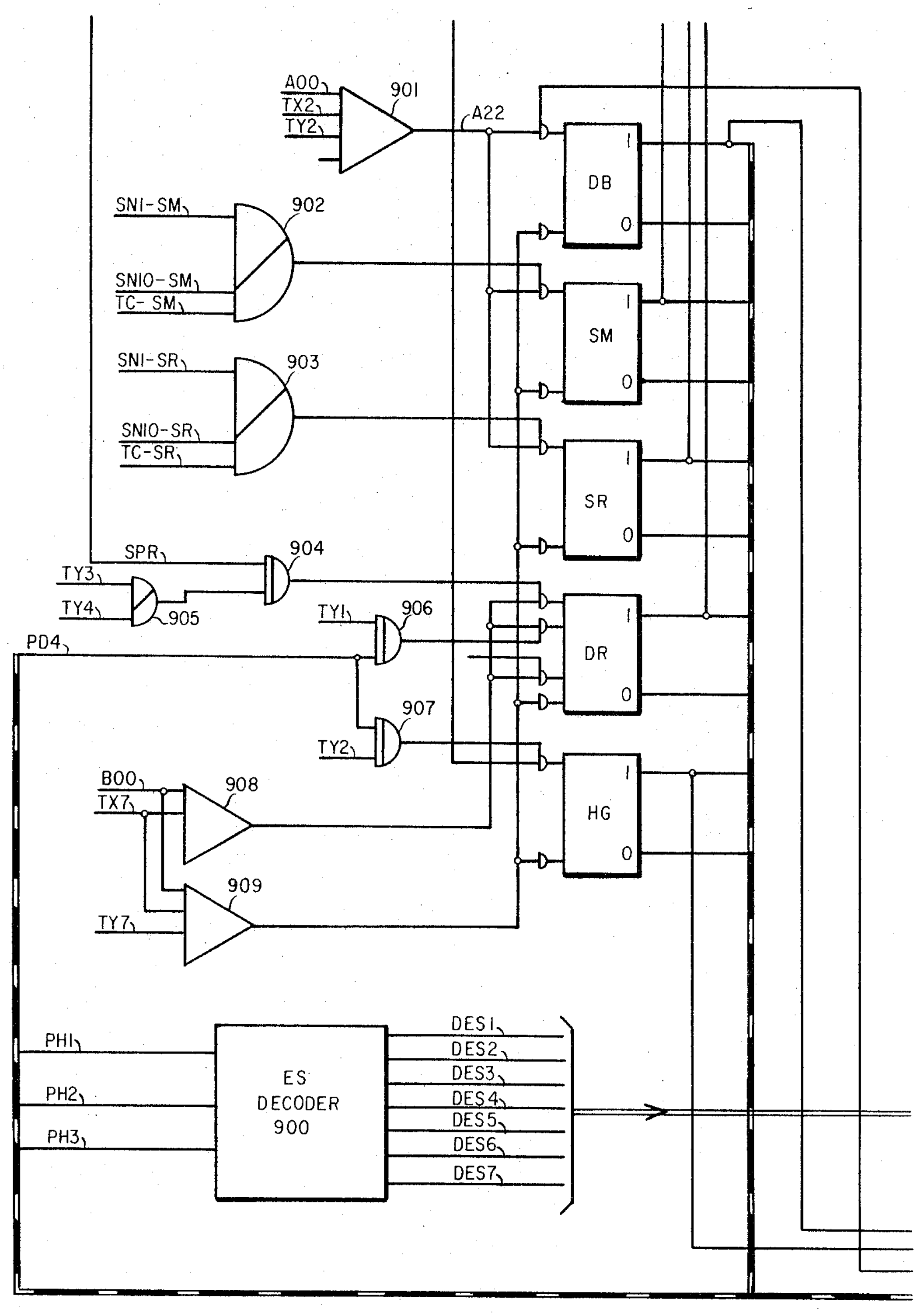

The reference characters for flip-flops, reed-relays, or other delay elements have been designated with not more than two letters; i.e. the DB flip-flop in the sender controller, FIG. 9. Whereas, signals originating from logic gates have been designated with three or more letters; i.e. signal LMF in the sender controller, FIG. 11. This convention has been followed wherever possible.

*C(1b) Register controller*

The register controller 264 comprises timing logic, information transfer logic, and decision control logic to arrange information from the various parts of the system for presentation to the ferrite-core memory. For a complete disclosure of the register controller, see the patent application by Lee et al., Serial No. 308,112. Logic commands are generated entirely by electronic gates utilized on a time division multiplex basis by the system.

Figure 3:
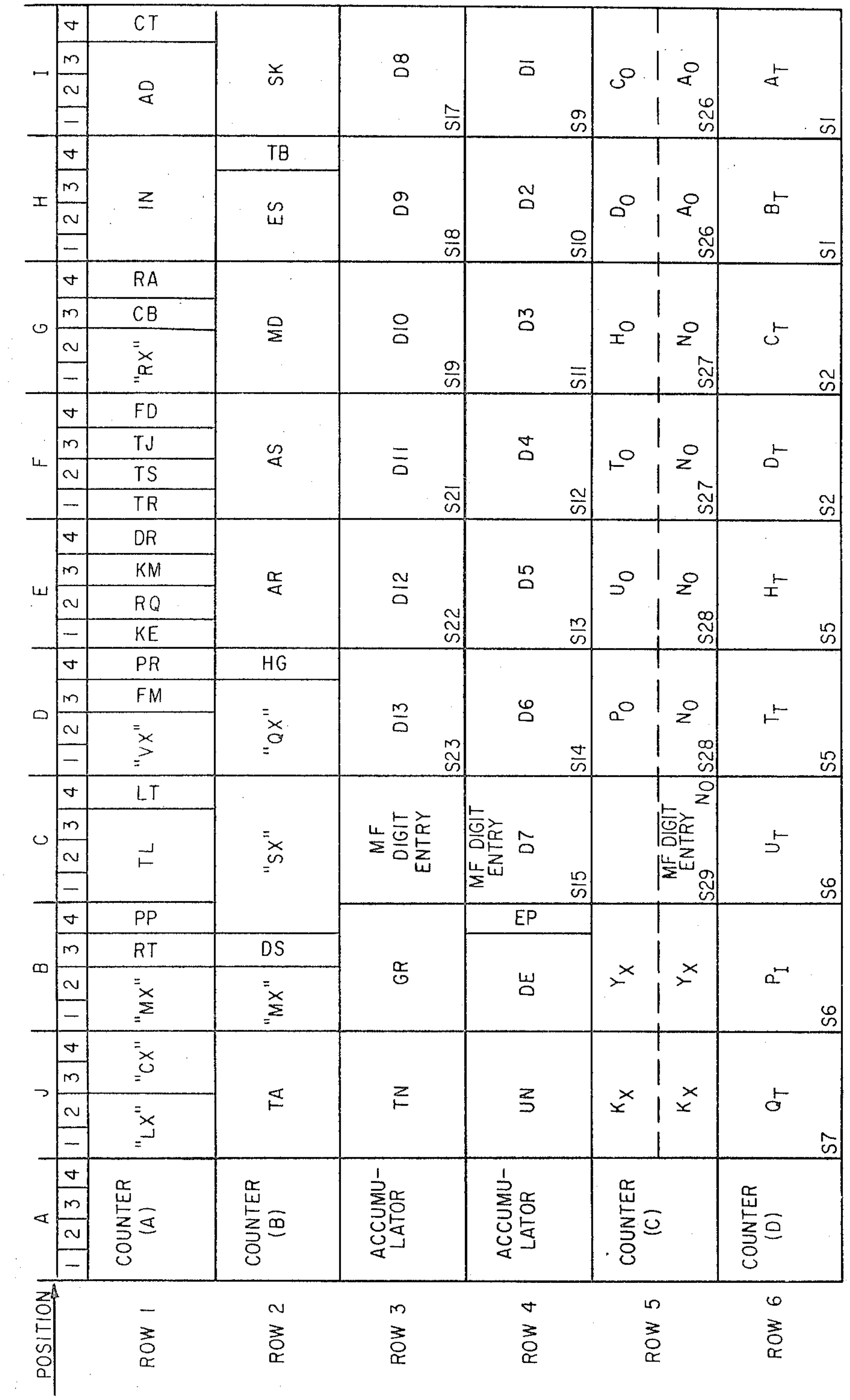
FIG. 3 is a chart which is useful in understanding the operation of the register.

This equipment in association with the read shift buffer arranges the dialed digits to be written into the memory. Each register of the ferrite-core memory is arranged as shown in FIG. 3. As many as thirteen dialed digits are capable of being arranged for presentation to rows 3 and 4 of the memory. These digits being transmitted to the register controller are in the form of either dial pulse, multi-frequency signalling, or code-pulse.

A maximum of seven digits of line trunk number identification are also arranged for presentment to memory row 5. Two digits of originating class of service information are accumulated in connection thereto. Provision is also made for a maximum of nine digits of translated switching information with three digits of sender control instructions and four process digits for presentation to the memory. The sequence of operation of the registers for the process of a call is based upon these four digits of processing instructions, which are transmitted between the register sender and the translator.

If a call is orginated locally and required ticketing, the calling partly's directory number is received from the translator. If a call originates from a tributary office for which ticketing is necessary, the calling party's directory number is forwarded from the tributary office, such as by means of multi-frequency signals, and later transferred to the ticketer. In both cases this information is prepared by the register controller for presentment. There are also three digits of ticketer identity information as well as one digit of alternate route instructions. The address of a sender having been assigned is also accumulated for presentation to the memory.

The above-mentioned logic transfers information from various portions of the system to the memory. However, the register controller also generates new commands which are also presented to the memory; i.e., timing control logic and decision control logic. The operation of each component is timed and a time-out signal is generated when a component remains in operation for an undesirable period of time. The timing control logic also analyzes the information received via the pulse highway.

The decision control logic comprises several groups of binary counter logic to provide sequence states for the sequential operation of the register sender group. The register sequence (RX), sender sequence (SX), sender-seizure sequence (QX), and register-disconnect sequence (VX) are generated by these counters. There are also sequence states for the transfer of dialed digits from row three of the memory to row four of the memory. The decision control logic further comprises several miscellaneous commands as follows: trouble indications from the senders, common control logic, and the register junctors; information indicating that the identity of the group selector has been recognized, which is part of the ticketer-identity information; busy condition of the register receiver; request of service and busy condition of the register receiver; request of service of the sender; trouble recorder information; disconnect of the sender; disconnect of the register; pulse highway information; recognition of MF interdigital pause; completion of dialing; coin-box call; early out-pulse control; and trouble indications for the routiner.

Referring now to FIGS. 4–7, the write commands for positions G and I of row 2 (mode digit and skip digit) and the decision control logic for modification of the mode digit and of the skip digit are shown with the elimination of the logic that affects other rows of the memory. Information is transferred to the ten groups of logic which form ten positions, A–J, for presentation to the memory. Each of the groups of logic are divided into four subgroups to generate four bits of information. For example, position G comprises the four write commands MWG1–4 shown in FIG. 6, which are written into the ferrite-core memory. The forty bits of information are transferred to the columns of the ferrite-core array during each sub-time slot. Therefore, one memory row at a time is simultaneously written into the memory during a time slot. One register-sender group utilizes twenty-four registers. During a register's time slot, the first row of each register is enabled twice, once during the first sub-time slot of the register and once during the seventh sub-time slot of that particular register.

The mode digit is originally transferred from the storage area in the translator via leads NP1–4 from the translator to AND gates 641–44 in coincidence with the transfer command (TY2 KE CP1 ULC) and thence to AND gates 601–4 for transmission to position G of row 2 of the memory. This digit of information is rewritten from the read shift buffer via leads PG1–4 to AND gates 647–50 and thence to AND gates 601–4 for recirculation to the memory. The mode digit can be selectively modified once it has been received from the translator for storage in the memory, by means of the mode digit control logic. Logic signals G401, G403, and G404 are generated to modify the mode digit in response to the receipt of the alternate route digit, AR digit, from the group selector marker via the sender; which is then written into the memory in position E of row 2. The sender then transfers this digit to the sender controller where it is decoded only if its value corresponds to certain values of alternate route information. This decoded signal is the alternate route digit which is transferred to the register controller for storage in the memory. The significance of the various values of this digit is shown in the following table:

| Value | 4 | 3 | 2 | 1 | |
|---|---|---|---|---|---|
| 0 | 0 | 0 | 0 | 0 | Clear. |
| 1 | 0 | 0 | 0 | 1 | Trunk Busy. |
| 2 | 0 | 0 | 1 | 0 | Unassigned. |
| AR= 3 | 0 | 0 | 1 | 1 | MF—Called No. |
| AR= 4 | 0 | 1 | 0 | 0 | DP—Called No. |
| AR= 5 | 0 | 1 | 0 | 1 | DP—HT and Called No. |
| AR= 6 | 0 | 1 | 1 | 0 | DP—UPQ and Called. |
| AR= 7 | 0 | 1 | 1 | 1 | NF—UPQ and Called. |
| AR= 8 | 1 | 0 | 0 | 0 | DP—Called No., Delete Area Code. |
| AR= 9 | 1 | 0 | 0 | 1 | MF—Called No., Delete Area Code. |
| AR=10 | 1 | 0 | 1 | 0 | DP—HTUPQ and Called No. |
| 11 | 1 | 0 | 1 | 1 | Unassigned. |
| 12 | 1 | 1 | 0 | 0 | Line Idle. |
| 13 | 1 | 1 | 0 | 1 | Line Busy. |
| AR=14 | 1 | 1 | 1 | 0 | Resend. |
| 15 | 1 | 1 | 1 | 1 | Incomplete. |

The values of the digit listed in the table corresponding to 0–2, 11–13, and 15 are information signals utilized by the sender.

Logic gates 406–10 are selectively enabled in response to the receipt of the AR digit into position E of the memory. The mode digit is only modified once the digit is in storage which causes signal HG to be true. This signal HG is generated in response to the setting of flip-flop HG in the sender controller, designating that the digit is in storage. Furthermore the digits received from the sender must be properly stored during the present multiplex cycle as designated by signal DB which is generated in response to the setting of flip-flop DB in the sender controller. This condition enables AND gate 413, which enables AND gate 405 in response to a signal from the sender to thereby cause the AR digit to modify the mode digit. AND gate 405 can also be enabled by the condition ($\overline{HG}$ $\overline{DPE0}$) via AND gate 514, where DPE0 means that position E of the memory is empty.

Only AR digits equal to 3–9 cause a modification of the mode digit. Furthermore, these AR digits generate a mode digit equal to 8 or 11; but it can be readily seen that other mode digits could be generated. The following table shows the modification of the mode digit in response to the AR digit:

If:
$AR=3$ then $MD=11=1101$
$AR=4$ then $MD=8=0001$
$AR=5$ then $MD=8$
$AR=6$ then $MD=8$
$AR=7$ then $MD=11$
$AR=8$ then $MD=8$
$AR=9$ then $MD=11$ The skip digit, SK digit, is transferred from the translator storage area via the register-transceiver shift register to the memory via leads MR1–4 to AND gates 721–24. This digit selects the switching digits needed to establish a connection to the called line as all of the digits for all possible routes are received from the translator and stored in memory row six. These AND gates are enabled as a result of the transfer command (TY2 KE CP1 ULC) generated via AND gate 760, thereby causing the skip digit to be written into position I of row 2 of the memory via AND gates 701–4. The skip digit is rewritten for recirculation of the memory via AND gates 725–28 from the PI1–4 flip-flops of the read shift buffer. The skip digit can be selectively modified by means of the modification of skip digit logic, which generates logic commands G501–6, 405. These commands are generated in response to receipt of the AR digit from the read shift buffer, simultaneously with the modification of the mode digit. Logic gates 501–15 are enabled from the PI1–4 flip-flops of the read shift buffer in response to receipt of the AR digit in storage of the memory. These logic gates are enabled in response to the same conditions as the logic gates for the mode digit control logic; namely, $(SN1-RS+SN2-RS+\ \ldots\ +SN10-RS)(HG\ DB+\overline{HG}\ DPE0)$. The skip digit is modified in order to select the proper switching digits for the establishment of a connection to the called line. The skip digit is modified in response to the receipt of an alternate route digit as shown in the following table:

If:
$AR=3$ then $SK=6=0110$
$AR=4$ then $SK=6=0110$
$AR=5$ then $SK=10=0101$
$AR=6$ then $SK=2=0100$
$AR=7$ then $SK=2=0100$
$AR=8$ then $SK=4=0010$
$AR=9$ then $SK=4=0010$
$AR=10$ then $SK=0=0000$ The sender sequence state logic 490 generates signals W2B4, and W2C1–4 to provide five bits for row 2 that create 31 sequence states to control the processing of the terminating call. The sender sequence states are normally advanced one state each time the sender requests more digits, except as affected by the skip digit. The logic is as follows:

$$\begin{aligned} W2B4=&TY2\ (PB4+SEQ\ \overline{PB4}+DQX3\ \overline{LAT}\ DSX0)\\ &(\overline{SEQ}+\overline{PB4})\ \overline{AR14}\ (\overline{SN1-RS}+\overline{SN2-RS}+\ldots\\ &+\overline{SN10-RS})[DSX4+(PI1+PI2+PI3+PI4)\\ &\{PI1+PI3+(\overline{PI2}+PI4)(PI2+\overline{PI4})\}](\overline{DSX8}\\ &+PI1\ PI3+\overline{PI1}\ \overline{PI2}\ \overline{PI4}) \end{aligned}$$

$$\begin{aligned} W2C1=&TY2\ \ (\overline{SN1-RS}+\overline{SN2-RS}+\ \ldots\ +\overline{SN10-RS})\\ &\overline{AR14}\ [DSX8\ PI1+\overline{SEQ}+\overline{PB4}+\overline{PC1}+\overline{PI4}\\ &DSX4\ (PI1+\overline{PI3}+PI4)\ (PI1+PI2+PI4)]\\ &[DSX8\ PI1+SEQ\ PB4\ \overline{PC1}+\overline{PI4}\ LSX4\\ &(PI1+\overline{PI3}+PI4)\ (PI1+PI2+PI4)]\\ &(\overline{DSX5}+PI1+\overline{PI2}+PI3+\overline{PI4}) \end{aligned}$$

$$\begin{aligned} W2C2=&TY2\ (\overline{DSX5}+PI1+\overline{PI2}+PI3+\overline{PI4})\\ &(\overline{SN1-RS}+\overline{SN2-RS}+\ \ldots\ +\overline{SN10-RS})\ \ \overline{AR14}\\ &[SEQ\ PB4\ PC1\ \overline{PC2}+PC2+(DSX8\ PI3)\\ &(PI1+\overline{PI2})][\overline{DSX4}+(\overline{PI1}+PI3+PI4)\\ &(PI1+\overline{PI2}+\overline{PI3}+PI4)\ (PI1+PI2+PI3+PI4)]\\ &[SEQ\ PB4\ PC1\ PC2+PC2+DSX8\ PI3\\ &(PI1+\overline{PI2})] \end{aligned}$$

$$\begin{aligned} W2C3=&TY2\ \ (\overline{SN1-RS}+\overline{SN2-RS}+\ \ldots\ +\overline{SN10-RS})\\ &\overline{AR14}\{[\overline{DSX5}+PI1+\overline{PI2}+PI3+\overline{PI4}+\overline{SEQ}\\ &+\overline{PB4}+\overline{PC1}+\overline{PC3}]+[DSX4\ \overline{PI4}\ (PI1+PI3)]\}\\ &\{[DSX4\ \overline{PI4}\ (PI1+PI3)+PC3+[SEQ\ PB4\\ &PC1\ PC2\ \overline{PC3}]+[\overline{DSX5}+PI1+PI2+PI3\\ &+\overline{PI4}]\}[\overline{DSX8}+PI1+\overline{PI2}+\overline{PI3}+\overline{PI4}] \end{aligned}$$

$$\begin{aligned} W2C4=&TY2\ \ \ (\overline{SN1-RS}+\overline{SN2-RS}+\ \ldots\ +\overline{SN10-RS})\\ &\overline{AR14}\ [(\overline{SEQ}+\overline{PB4}+\overline{PC1}+\overline{PC2}+\overline{PC3}+\overline{PC4})\\ &+(DSX8\ \overline{PI1}\ PI2\ PI3\ PI4)+(DSX4\ \overline{PI1}\ \overline{PI2}\\ &\overline{PI3}\ PI4)]\ [(DSX4\ \overline{PI1}\ \overline{PI2}\ \overline{PI3}\ PI4)+(DSX8\\ &\overline{PI1}\ \overline{PI2}\ \overline{PI3}\ PI4)+PC4+(SEQ\ PB4\ PC1\\ &PC2\ PC3\ \overline{PC4})] \end{aligned}$$

*C(1c) Sender controller*

Referring now to FIGS. 8–13, the sender controller 287 provides the gating control needs for proper transfer of information to the senders of the translated switching digits, dialed digits, and one of the following: LNI, TNI, or the directory number of the calling subscriber. It also controls the sending mode used to outpulse these digits. Gating control is also provided for the return of alternate route instructions and ticketer identity.

Figure 4:
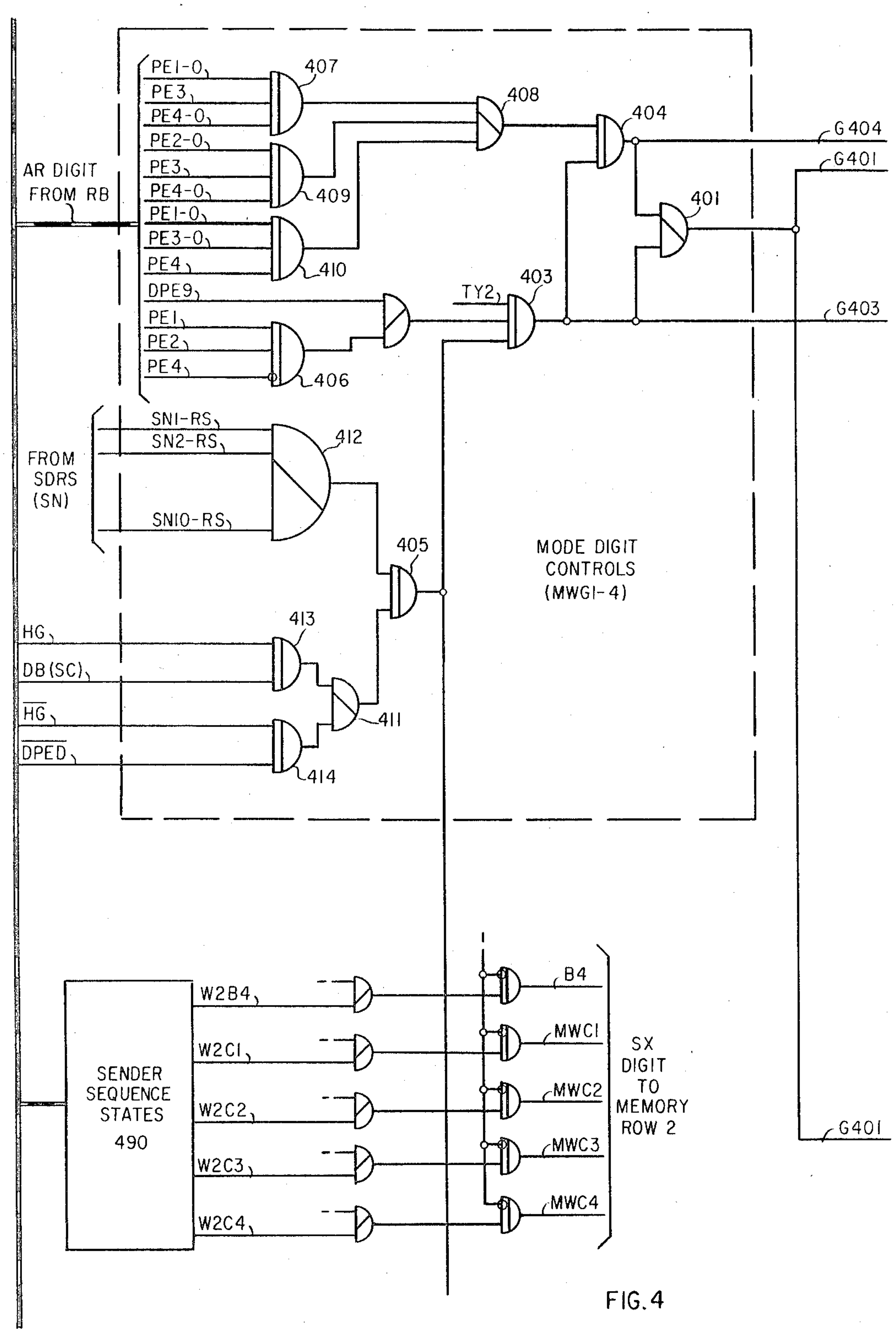
Figure 5:
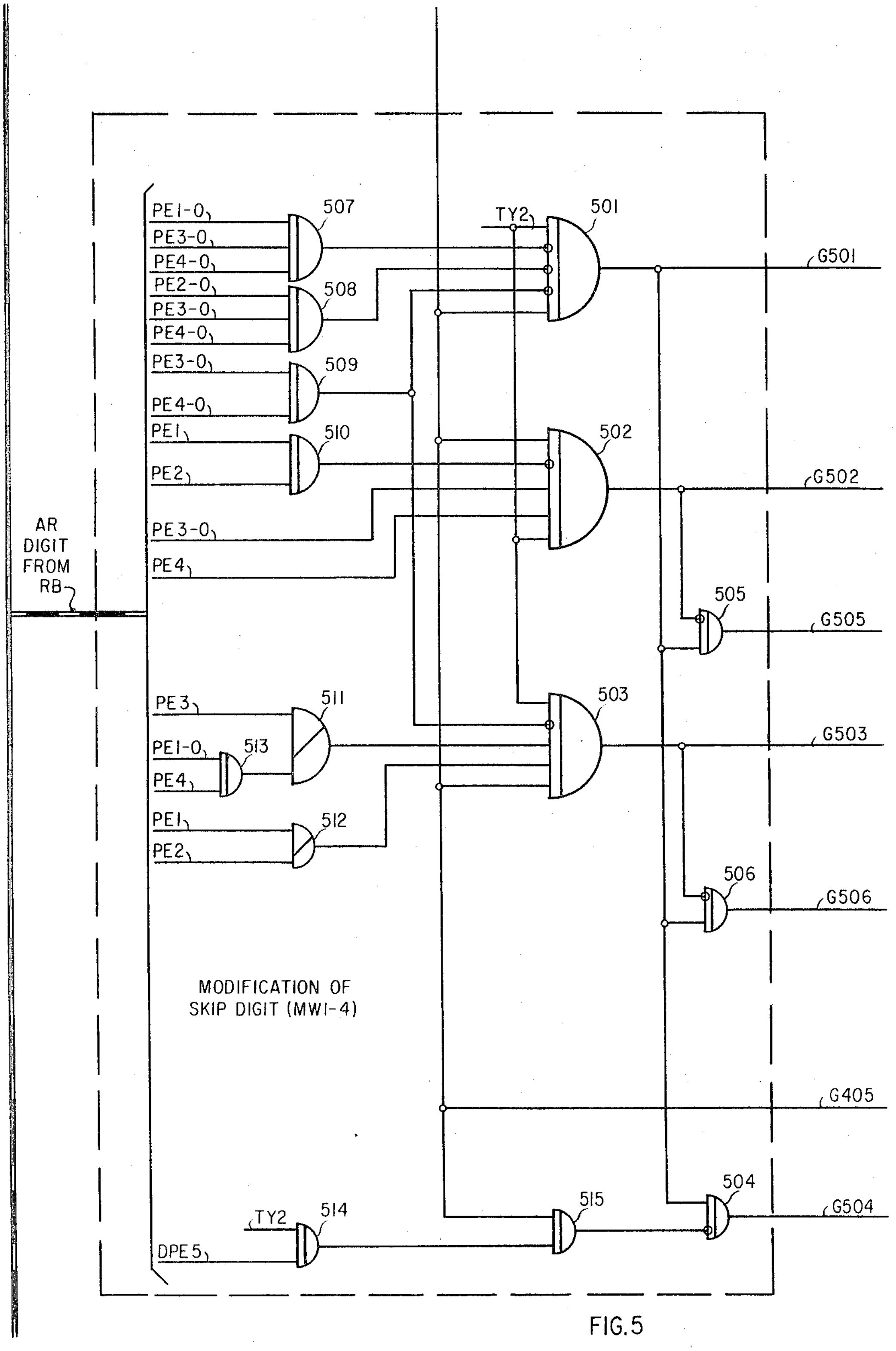
Figure 6:
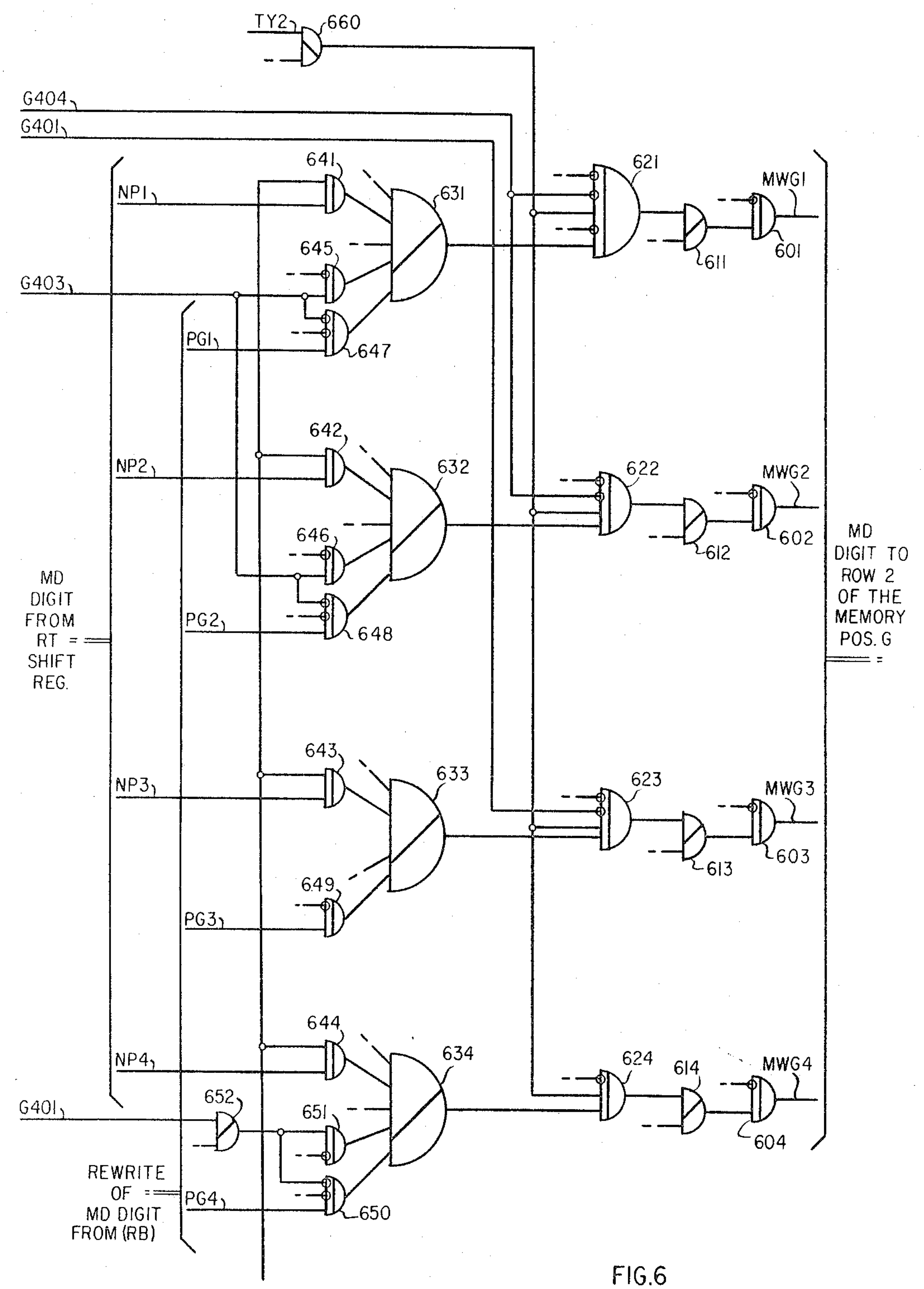
Figure 7:
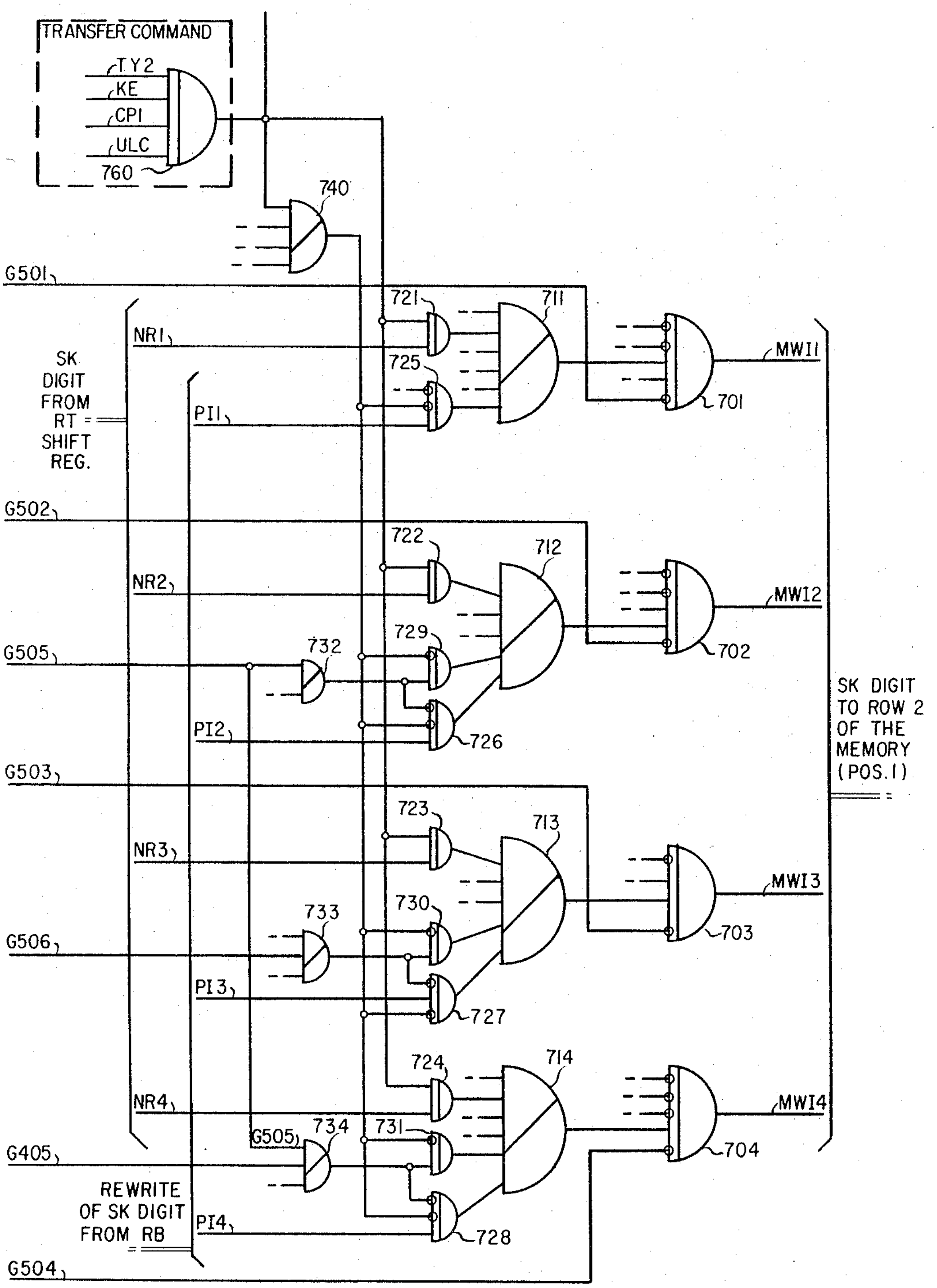
Figure 8:
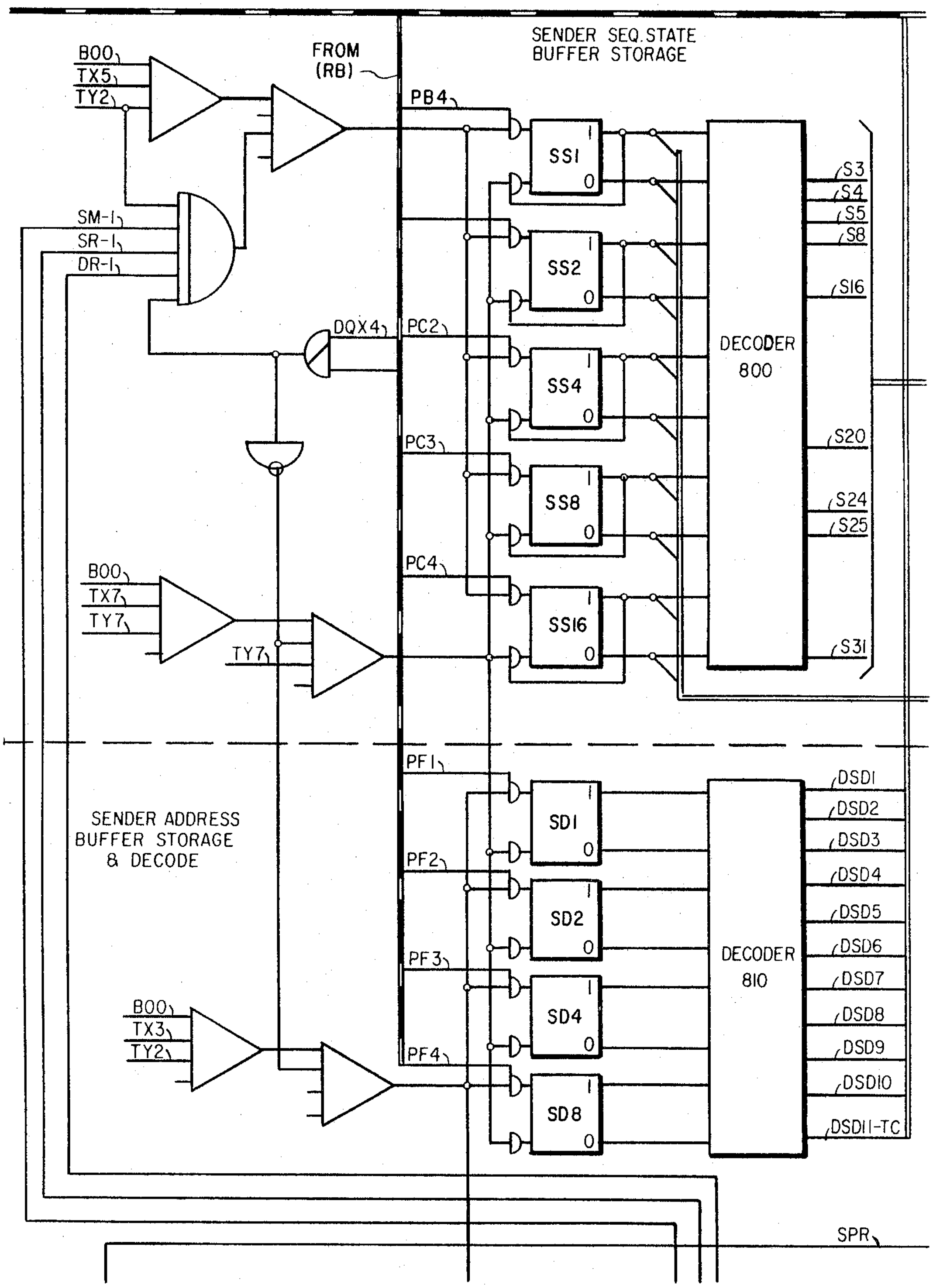

Flip-flops SS1, SS2, SS8 and SS16 in FIG. 8 comprise the sender sequence state buffer storage area which receives the sender sequence state information stored in the memory via the read-shift buffer (PB4, PC1–4). The sender sequence states are decoded via decode logic 800 from binary to a one-out-of-31 code to provide 9 sender sequence states that are used for end of send, skip digit, and mode digit operations. The remaining sender sequence states designated by the SS flip-flops provide sender sequence states for the gating matrix in FIGS. 10 and 12 for transferring switching digits to the senders. The states of the SS flip-flops are modified by the sender sequence state logic 490 in the register controller as shown in FIG. 4 and is advanced by means of signal SEQ which is generated by logic located in the read shift buffer as follows:

$$\begin{aligned} SEQ&=DQX4\ SM\ SR\ (FD+\overline{FD}\ \overline{W})+DQX4\ SM\ SR\\ &\quad\overline{FD}\ W\ PR\\ &=DQX4\ SM\ SR\ (FD+\overline{W}+PR)\\ W\ &=S9+S10+S11+S12+S13+S14+S15+S17+S18\\ &\quad+S19+S21+S22+S23 \end{aligned}$$

The following tables explain the interaction of the sender states with information from the registers and translators.

| Snd. Seq. State | Mem. Pos. Affected | Snd. Seq. State | Mem. Pos. Affected | Snd. Seq. State | Mem. Pos. Affected |
|---|---|---|---|---|---|
| S1 | A, B | S11 | D3 | S21 | D11 |
| S2 | C, D | S12 | D4 | S22 | D12 |
| S3 | None | S13 | D5 | S23 | D13 |
| S4 | None | S14 | D6 | S24 | None |
| S5 | H, T | S15 | D7 | S25 | None |
| S6 | U, P | S16 | None | S26 | A1, A2 |
| S7 | Q | S17 | D8 | S27 | N1, N2 |
| S8 | None | S18 | D9 | S28 | N3, N4 |
| S9 | D1 | S19 | D10 | S29 | N5 |
| S10 | D2 | S20 | D20 | S30 | None |
| | | | | S31 | None |

DELETE DIGIT

| DE | EP |
|---|---|
| 12=001 | 1=Successful LNT. |
| 13=101 | 1=Unsuccessful LNT. |

SKIP DIGIT—"SK"

| Sum. | | Dig. | | Binary | | From | To |
|---|---|---|---|---|---|---|---|
| SK | = | 1 | = | 1000 | = | S4 | S10 |
| | | 2 | = | 0100 | = | S4 | S6 |
| | | 3 | = | 1100 | = | S4 | S11 |
| | | 4 | = | 0010 | = | S4 | S12 |
| | | 5 | = | 1010 | = | S4 | S14 |
| | | 6 | = | 0110 | = | S4 | S9 |
| | | 7 | = | 1110 | = | S4 | S15 |
| | | 8 | = | 0001 | = | S4 | S16 |
| | | 9 | = | 1001 | = | S8 | S10 |
| | | 10 | = | 0101 | = | S5 | S8 |
| | | 11 | = | 1101 | = | S8 | S11 |
| | | 12 | = | 0011 | = | S8 | S12 |
| | | 13 | = | 1011 | = | S8 | S14 |
| | | 14 | = | 0111 | = | S8 | S16 |
| | | 15 | = | 1111 | = | S8 | S15 |
| | | 16 | = | 0000 | = | No Skip | |

END OF SEND—"ES"

| Sym. | | Dig. | | Binary | | When End Of Send Sig. Is Sent |
|---|---|---|---|---|---|---|
| ES | = | 1 | = | 100 | = | S3 |
| | | 2 | = | 010 | = | S8 |
| | | 3 | = | 110 | = | S16 |
| | | 4 | = | 001 | = | S20 |
| | | 5 | = | 101 | = | S24 |
| | | 6 | = | 011 | = | S31 |
| | | 7 | = | 111 | = | S25 |

| Sum. | | Dig. | | Binary | | Signal Sent In | | |
|---|---|---|---|---|---|---|---|---|
| | | | | | | S4 | S8 | S25 |
| MD | = | 1 | = | 1000 | = | None | MF | None |
| | | 2 | = | 0100 | = | None | DP | None |
| | | 3 | = | 1100 | = | | Unused | |
| | | 4 | = | 0010 | = | None | None | MF |
| | | 5 | = | 1010 | = | None | MF | DP |
| | | 6 | = | 0110 | = | None | DP | MF |
| | | 7 | = | 1110 | = | None | None | DP |
| | | 8 | = | 0001 | = | DP | None | None |
| | | 9 | = | 1001 | = | DP | MF | None |
| | | 10 | = | 0101 | = | MF | DP | None |
| | | 11 | = | 1101 | = | MF | None | None |
| | | 12 | = | 0011 | = | DP | None | MF |
| | | 13 | = | 1011 | = | DP | MF | DP |
| | | 14 | = | 0111 | = | MF | DP | MF |
| | | 15 | = | 111 | = | MF | None | DP |
| | | 16 | = | 0000 | = | | | |

If *MD*=10 or *MD*=14 is sent to register-sender group by the translator then the "ST" digit must also be sent. This is a digit to be stored in the Q position of the register-sender group memory.

Figure 10:
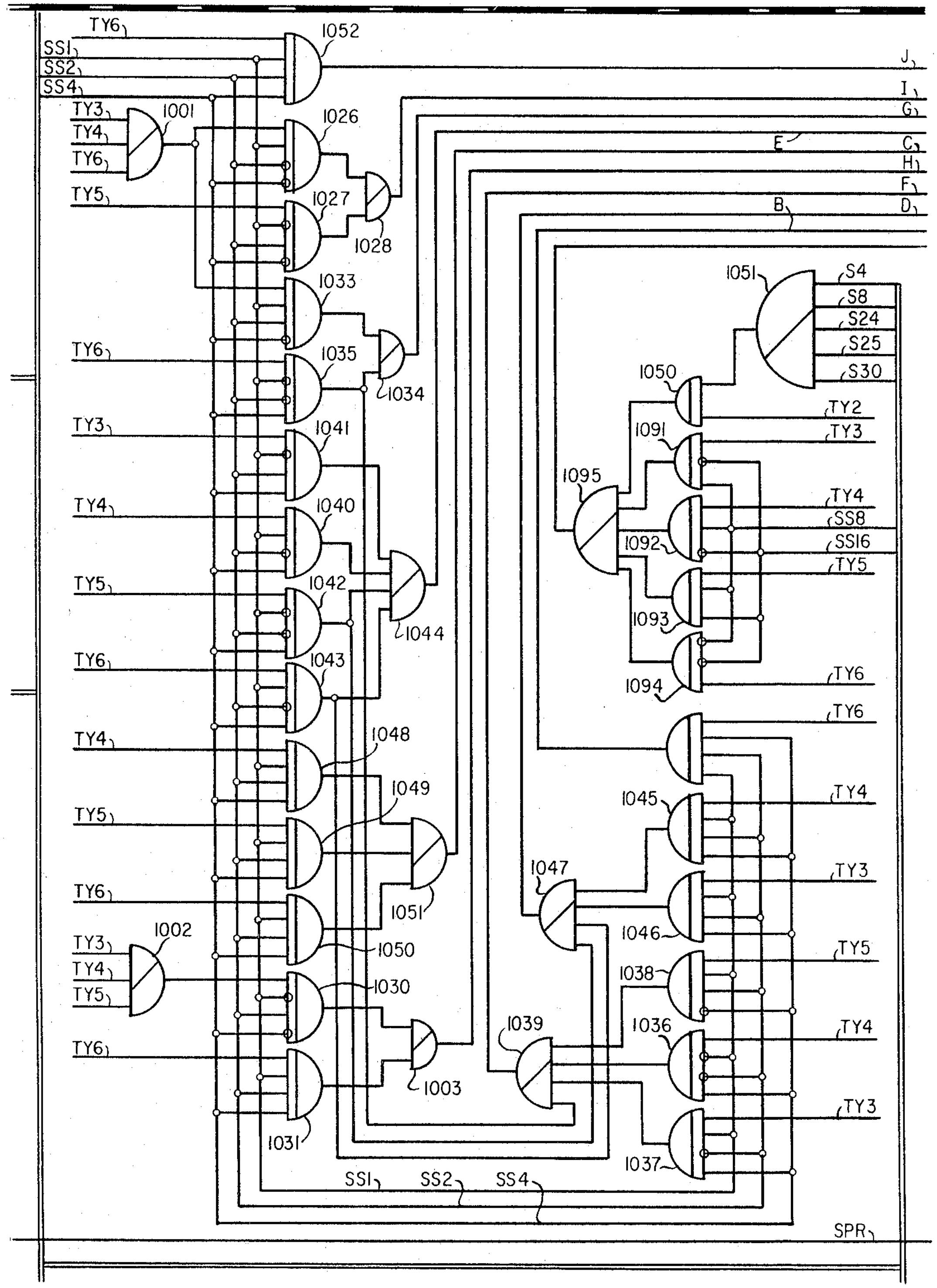

The sender sequence states are gated during TY3–6 via the logic gates shown in FIG. 10 to provide time division multiplexing control for the switching digits to be out-pulsed by a sender from the register via the read-shift buffer. The information to be out-pulsed by the sender is gated to the senders via logic AND gates 1203–10 shown in FIG. 12, together with the aforementioned time division multiplexing signals, to leads A1, A2, A4, A8, B1, B2, B4, and B8 which are connected to the A and B storage areas in each of the senders. Either one or two digits at a time are forwarded to the senders.

Figure 12:
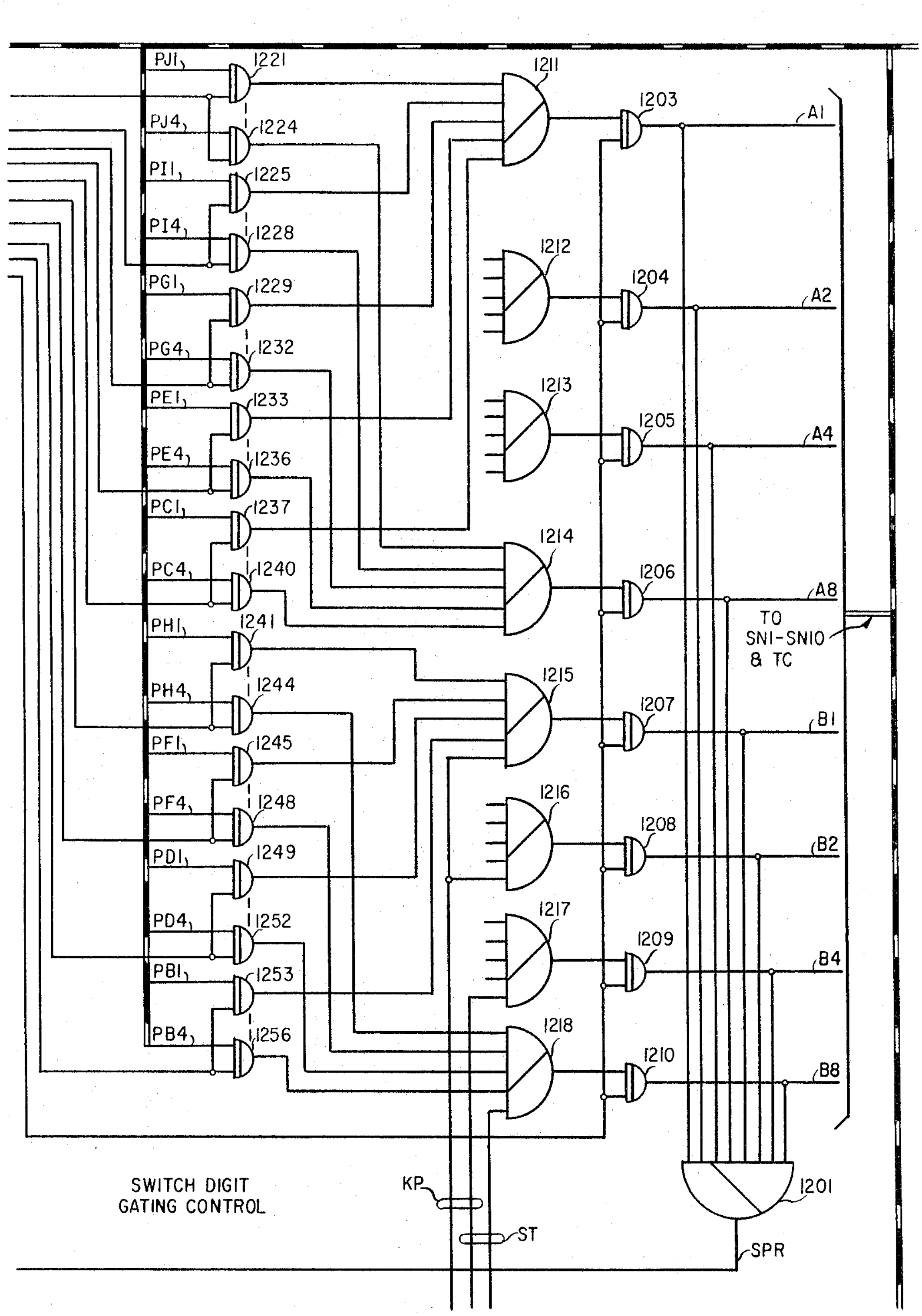

FIGS. 10 and 12 show the matrix gating arrangement to transfer the switching instructions to the sender. AND gates 1203–10 supply one or two digits to the A and B storage area in the senders. These gates are enabled in response to OR gate 1095, which is enabled in response to AND gates 1091–94 that select a row in the memory to be accessed. Rows 3–6 may be accessed as indicated by signals TY3–6 in coincidence with the state of flip-flops SS8 and 16. AND gate 1050 causes AND gates 1207–10 to be enabled during TY2 for the end-of-send signal and the KP signal, which are generated by the sender controller to enable OR gates 1215–18.

The digits of information that are received from the memory from positions B–J are taken from the read-shift buffer to AND gates 1221–56. These AND gates are connected to OR gates 1211–18 and thence to AND gates 1203–10. The set of four AND gates corresponding to a given position are enabled via the logic gates shown in FIG. 10. For example, AND gate 1052 enables AND gates 1221–24 to gate position J to AND gates 1203–6, and thence to the A storage area in the sender. Position J is accessed during TY6, which corresponds to row 6 of the memory. Flip-flops SS1, 2, and 4 select the position to be accessed from the memory.

Therefore, it can be seen that a matrix gating scheme is established wherein the various positions of the memory are accessed and transferred to the sender in response to flip-flops SS1, 2, and 4 to enable OR gates 1211–18. Flip-flops SS8 and 16 select the row of the memory to be out-pulsed so that AND gates 1203–10 are enabled in coincidence with a given position and a given row.

Furthermore, the TY signals which designate a given row of the memory are used in selecting a given position so that the sequence of accessing the memory corresponding to the states designated by flip-flops SS1, 2, and 4 may be different for different rows. This arrangement allows greater flexibility; as for example, position I which is controlled by logic gates 1001, 1026–28 provides for states S1, S26, S9, and S17 to gate information from memory position J for rows 6, 5, 4, and 3 respectively as shown in FIG. 3. States S1, S9, and S17 are generated via AND gate 1026 for the condition $(TY3+TY4+TY6)$ $(S1\,\overline{S2}\,\overline{S4})$ together with the appropriate SS8 and SS16 condition provided by OR gate 1095 and its associated logic; whereas state S26 is generated via AND gate 1027 for the condition $(TY5\,\overline{S1}\,S2\,\overline{S4})$. Therefore, it can be seen that with the addition of the TY signal, state S26 could be utilized for position I in this same matrix gating scheme without being forced to use state S25, which would normally follow from the condition $(S1\,\overline{S2}\,\overline{S4})$.

OR gates 2211–18 cause the eight positions B–J to be channelled down to two digits for storage in the A and B storage area of the sender. As a result of this channelling arrangement, only eight AND gates 1203–10 are needed to select the given row. It will be apparent to one skilled in the art that the eight positions could be coupled to one or more four-bit storage areas, but in this embodiment one or two digits are transferred to the sender.

By using this matrix gating arrangement, the five sender sequence flip-flops are divided into two groups such that SS1, 2, and 4 flip-flops are used to designate a given position, and flip-flops SS8 and 16 are used to designate a given row in the memory. All five flip-flops used together designate 31 different sequence states for controlling the switching digits, mode digits, skip digit, and the end of send. The following table shows the 31 sender sequence states and the information which they control:

| S.S. State | Digits | Row | Position | Mode | SK | ES |
|---|---|---|---|---|---|---|
| 1 | A,B | 6 | I–H | | | |
| 2 | C,D | | G–F | | | |
| 3 | | | | | | 1 |
| 4 | | | | MD | 1+2+. . .+8<br>10 | |
| 5 | H,T | 6 | E–D | | | |
| 6 | U,P | 6 | C–B | | | |
| 7 | Q | 6 | J | | | |
| 8 | | | | MD | 9+11+. . .+15 | 2 |
| 9 | $D_1$ | 4 | I | | | |
| 10 | $D_2$ | 4 | H | | | |
| 11 | $D_3$ | 4 | G | | | |
| 12 | $D_4$ | 4 | F | | | |
| 13 | $D_5$ | 4 | E | | | |
| 14 | $D_6$ | 4 | D | | | |
| 15 | $D_7$ | 4 | C | | | |
| 16 | | | | | | 3 |
| 17 | $D_8$ | 3 | I | | | |
| 18 | $D_9$ | 3 | H | | | |
| 19 | $D_{10}$ | 3 | G | | | |
| 20 | | | | | | 4 |
| 21 | $D_{11}$ | 3 | F | | | |
| 22 | $D_{12}$ | 3 | E | | | |
| 23 | $D_{13}$ | 3 | D | | | |
| 24 | | | | | | 5 |
| 25 | | | | MD | | 7 |
| 26 | A,N | 5 | I–H | | | |
| 27 | N,N | 5 | G–F | | | |
| 28 | N,N | 5 | E–D | | | |
| 29 | N | 5 | C | | | |
| 30 | | | | | | |
| 31 | | | | | | 6 |

When the digits furnished are to be outpulsed in a multifrequency mode, the start (KP) and end of send (ST) digits are generated and also forwarded by means of OR gates 1215–18. The stop designation is equal to 12 in the B position and is generated via logic gates 1101–12. During TY2, LST becomes true which enables OR gates 1217–18, thereby generating a 12 which is an end of send indication. The start signal is generated by causing an 11 to be generated in the B position. Logic gates 1122–26 generate signal LMF which causes OR gates 1215–16, and 1218 to be enabled and to thereby generate an 11. The generation of an 11 in position B signifies the KP digit which informs the sender to start sending. Outpulsing of KP and ST digits are as follows:

A. KP digit is inserted any time that an MF signal is extended to the senders, and B. ST digit is inserted under the following conditions:

| Mode Digit | End of Send | During State |
|---|---|---|
| MD= 1 | ES=6 | S30 |
| MD= 1 | ES=7 | S24 |
| MD= 4 | ES=6 | S30 |
| MD= 5 | ES=7 | S24 |
| MD= 6 | ES=6 | S30 |
| MD= 9 | ES=6 | S30 |
| MD= 9 | ES=7 | S24 |
| MD=11 | ES=6 | S30 |
| MD=11 | ES=7 | S24 |
| MD=11 | ES=3 | S8 |
| MD=12 | ES=6 | S30 |
| MD=13 | ES=6 | S24 |
| MD=15 | ES=6 | S24 |
| MD=10 | $Q_T$ Digit supplied from translator | S7 |
| MD=14 | | S7 |

Logic gates 1301–36 comprise the gating control for the alternate route instructions and ticketer identity which is transferred from the senders to the register storage area. Also, the AT signals are transferred from the control center (TC) to the register storage area. This information is stored in row 3 and row 4 of the memory by means of multiplexing gates 1325–36 in conjunction with sub-time slot signals TY2 and TY4. The alternate route via leads MAR1, 2, 4, and 8 and the identity of the group selector via leads MGR1, 2, 4, and 8 is transferred from the sender to the register. Subsequently, via the same gates, the tens and units address for the group selector outlet are also transferred to the register. In order to distinguish between the first and second send, flip-flop HG is set which enables AND gates 1317–24 and inhibits AND gates 1309–16 in order to switch from leads MGR1, 2, 4 and 8, MAR1, 2, 4, and 8 to MTU1, 2, 4, and 8, wherein the tens digit is placed in row 3 of the memory by using TY3 and the units digit is placed in row 4 of the memory by using TY4.

Flip-flops SD1, 2, 4, and 8 as shown on FIG. 8 comprise a binary weighted buffer storage area for the sender address information. The sender address is received from the read-shift buffer as the sender address AS is stored in the memory and is decoded by SD decoder 810 to provide signals DSD1–11. These decoded signals are transferred to the respective senders to exchange information to and from the sender controller and the senders during the time slot of the register. DSD11 is transferred to the control center (TC).

Figure 11:
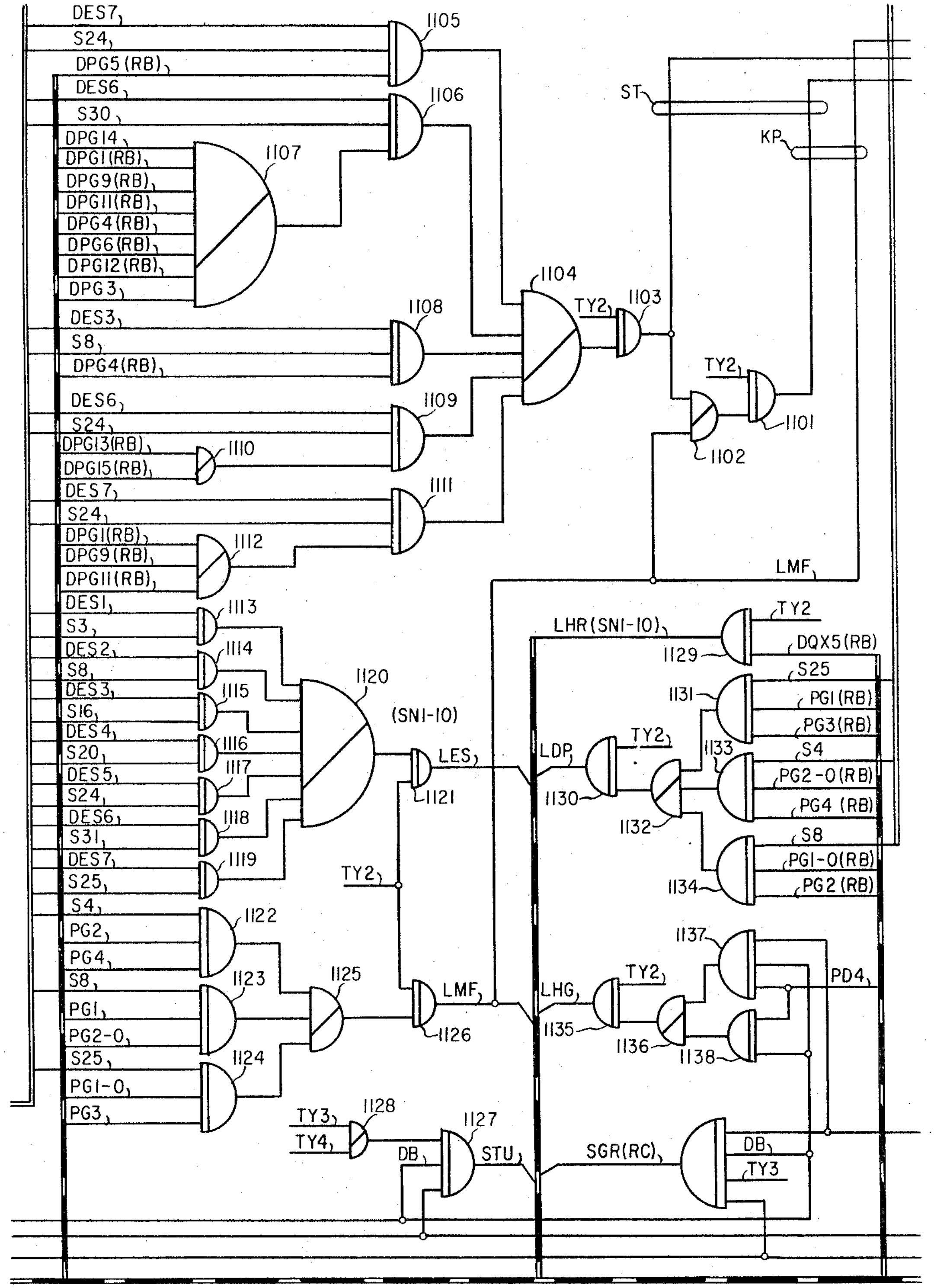

Referring now to FIG. 11, signal LES is generated via logic gate 1113–21 for the senders to indicate an end of send condition. Logic gates 1122–26 generate signal LMF which is transferred to the senders indicating a multi-frequency mode of sending. Signal STU is generated by means of logic gates 1127–28 to indicate that the TN and UN digits are to be stored. Signal LHR is generated by AND gate 1129 and is transferred to the sender to reset the HL flip-flop in the sender. Signal LDP is generated via logic gates 1130–34 and is transferred to the sender which indicates that outpulsing is required in a dial-pulse mode. Signal LHG is generated via logic gate 1135–38 and is transferred to the register controller which writes HG in the memory to designate a first send for the alternate route and ticketing identity digit. AND gate 1139 generates signal SGR and transfers it to the register controller, designating that the GR digit is to be stored.

Flip-flop DB designates that the digits received from the sender should be properly stored during the present system cycle. It is set in response to OR gate 1338, which is enabled via any one of AND gates 1309–24.

Flip-flop SM is set to designate that a request has been made for more digits by the sender.

Flip-flop SR is set to designate that the sender is available for the use by the register.

Flip-flop PR is set to designate that the digits have been presented to the sender for outpulsing and more may be sent. This flip-flop is set via OR gate 1201 which generates signal SPR in response to AND gates 1203–10.

Flip-flop HG is set to designate that the GR digit is in storage.

The ES decoder 900 decodes leads PH1–3 from the read-shift buffer to provide a one-out-of-seven code, DES1–7. This code is the end-of-send signal which is used to generate signal LES by logic gates 1113–21 for the end of send signal for the senders.

*C(2) Operation for completing a call*

Assume now that the originating portion of a call from one of the local subscribers as described in the application by Lee et al., Serial No. 308,112 has been completed. Assume further that the completing portion of an outgoing call now follows.

Sender SN1 is seized via the sender assigner 283 and its address is transferred from the sender assigner to the register controller for storage in the memory position F of row 2. In the next occurrence of the register time slot the address signal DSD1 is true, and the sender returns signals SR and SM, causing signal SEQ to be generated which advances the sequence state from S0 to S1. Sender SN1 grounds lead EC to seize the selector marker. Thereupon, the marker returns the connect signal (1010 1010) via diphase.

During sender sequence states S1 and S2 the following condition occurs in the sender controller:

Command:

$$TY6\ SS1\ \overline{SS2}\ \overline{SS4}\ \overline{SS8}\ \overline{SS16}$$
$$(PI1+PI2+PI3+PI4)$$

This condition causes AND gates 1225–28 in the sender controller to be enabled for the I position of the memory to thereby cause OR gates 1211–14 to be enabled. The I position is enabled via AND gate 1026 and OR gate 1001, which causes OR gate 1228 to be enabled. AND gates 1203–6 are enabled via OR gate 1095 and AND gate 1094. As a result, the $A_T$ digit stored in position I of the memory is transferred to the sender for outpulsing via leads A1, 2, 4, and 8. Simultaneously, position H is accessed via AND gates 1241–44 to enable OR gates 1215–18. These AND gates are enabled via OR gate 1003 and AND gate 1031. AND gates 1207–10 are enabled by the same signal that enables AND gates 1203–6. Therefore, position H of the memory is transferred to the sender via leads B1, 2, 4, and 8. Since digits $A_T$ and $B_T$ are blank for a normal call, signal SM remains true which causes the sender sequence states to advance from S1 to S2 which causes the $C_T$ and $D_T$ digits to be transferred from positions F and G of the memory to the sender in like manner. The sender sequence state then is advanced to state S3.

The $C_T$ and $D_T$ digits are sent via diphase from the sender to the selector market.

Assume at this point, that an alternate route is chosen by the selector, and that ticketing is required. Alternate route digit (*AR*=7) has been received from the group selector marker via sender SN1. This AR digit is then transferred to the register controller for storage in the memory via the gates shown in FIG. 13 of the sender controller. AND gates 1308, 1311, 1313, and 1315 are enabled as a result of the AR digit. AND gates 1310, 1312, 1314, and 1315 are simultaneously enabled to transfer the GR digit, which is the identity of the group selector for ticketing purposes, to the memory at position B of row 3. The inhibit inputs to these AND gates are at a zero condition due to the fact that flip-flop HG in FIG. 9 is in the reset condition since signal PD4 is false. This bit of information in the memory at row 2, position D4, will become true after the GR digit has been successfully stored in the memory to insure the successful storage of the GR digit.

Once the AR digit is stored in the memory in row 2 at position E, then MWE1, MWE2 and MWE3 are true since the AR digit equals 7. Upon the next time division multiplex cycle of the register, the following condition occurs:

Command:

$$TY2\ PE1\ PE2\ \overline{PE4}\ HG\ DB\ SN1\text{–}RS$$

This command enables mode digit control gates 401 and 403 of the register controller to thereby generate signals G401 and G403. AND gate 404 is disabled as a result of this condition. Therefore, the mode digit is modified for MF outpulsing. Signal G401 causes AND gate 623 to be disabled and thereby cause MWG3 to be false. Signal G403 enables AND gates 645 and 646 to cause signals MWG1–2 to be true. Signal G401 causes AND gate 651 to be enabled, causing signal MWG4 to be true. The net result is that the mode digit has been modified to $MD=11$ for storage in the memory.

The AR digit also simultaneously modifies the skip digit as a result of the following command:

Command:

$$TY2\ HG\ DB\ SN1\text{–}RS\ PE1\ PE2\ PE3\ \overline{PE4}$$

This command causes the modification of the skip digit by enabling gates 501, 503–5; which generates signals G501, 503–5 and causes signals G502, 506–7 to be false. This condition causes MWI2 to become true since AND gate 729 is enabled via signal G505 and signal 502 is false to prevent AND gate 702 from being inhibited. The remaining signals G501, 503–4, each being true, inhibit the remaining signals MWI1, 3–4 via the inhibit input of AND gates 701, 703–4 respectively. Therefore the net result is to modify the skip digit to a skip digit of $SK=2$ for storage in the memory row to position I.

After the sender SN1 receives the GR and AR digits, it transfers a signal via diphase to the marker designating that the GR and AR digits have been successfully received. Thereupon, the tens digit TN and the units digit UN for the group selector inlet are transferred to sender SN1 via diphase. The tens digit is then transferred to the sender controller via leads SN1–AT1, SN1–AT2, SN1–AT4, and SN1-AT8 to OR gates 1301–8. The units digit is transferred via leads SN1–GU1, SN1–GU2, SN1–GU4, and SN1–GU8. The tens and units digits are transferred to the register controller via OR gates 1326, 1329, 1332, and 1335 during TY3 and TY4 respectively into position J of the memory. The GR, TN, and UN digits are stored in the memory unitl they are needed by the ticketer and then they are transferred to the ticketer via the register transceiver.

After the TN and UN digits are stored in the memory the SEQ signal is generated in response to signal SM becoming true as a result of the sender SN1 requesting further digits for outpulsing, causing the sender sequence states to sequence to S4. Thereupon the MD digit and the KP digit, which is necessary for this example, are transferred to the sender controller in order to communicate to the sender SN1 that multifrequency outpulsing is required for this alternate route. The following condition occurs:

Command:

$$TY2\ S4\ PG2\ PG4=LMF$$

Signal LMF is generated and transmitted to the sender SN1 to indicate that MF sending is required, and also to enable OR gates 1215–16, and 1218 to generate a digit 11 via leads B1, 2, 4, and 8, which is the KP digit to start sending the multifrequency signals. Logic gates 1122, 1125, and 1126 generate signal LMF, and logic gates 1101–2 are enabled during sub-time slot TY2 to enable OR gates 1215–16, and 1218. Logic gates 1095, 1050–1 are enabled which thereby enable AND gates 1207–10.

The sender sequence states then skip from state S4 to state S6 as follows:

Command:

$$W2C1=TY2\ \overline{DSX5}\ SN1\text{–}RS\ \overline{AR14}\ (\overline{PB4}+\ .\ .\ .\ )\ (DSX4\ \overline{PI4}\ \overline{PI3}\ PI2)\ \overline{DSX5}$$

$$W2C2=TY2\ \overline{DSX5}\ SN1\text{–}RS\ \overline{AR14}\ PC2\ (\overline{PI1}\ \overline{PI3}\ PI2)\ PC2$$

The result of this condition causes the sender sequence states to advance to state S6. It should be noted that this condition results due to the fact that DSX4 was the previous sequence state, which caused PC2 to be true. Also, the skip digit was modified to $SK=2$, which made PI2 true.

Thereafter, the $U_T$, $P_T$, and $Q_T$ digits are outpulsed via the sender controller during states S6 and S7 in the same manner that the first four digits were transferred to the sender. During state S8 neither signal LDP nor signal LMF is generated which indicates to the sender that the mode of sending remains the same (multifrequency). The sender sequence states then sequence to state S9 where digit D1 is outpulsed. Thence digits D2–7 of row 4 are outpulsed in like manner. During state S16, nothing occurs if a ten digit call is in process. Assuming that this is a ten digit call, then digits D8–10 of row 3 are sequentially outpulsed; whereupon state S24 is reached. Nothing occurs until state S24 is reached as positions F, E, and D of memory row 3 are blank.

Then, during state S24 the stop digit ST is generated in the sender controller via OR gates 1215–18 with a value of 12 to indicate that sending has stopped. Or gates 1217–18 are enabled as a result of the following condition:

Condition:

$$TY2\ DES7\ S24\ DPG11$$

This condition causes logic gates 1101–4, and 1111–12 to be enabled since $MD=11$, $ES=7$ and the sender sequence states are in state S24. Logic gates 1095, and 1050–51 cause AND gates 1207–10 to be enabled, which thereby causes the ST digit (12) to be transmitted to the sender SN1 via leads B1, 2, 4 and 8 for outpulsing via the group selector marker designating that outpulsing has stopped.

The sender sequence states then advance to S25 which causes the following condition to occur:

Command:

$$TY2\ S25\ DES7=LES$$

Signal LES is generated via logic gates 1119–21 to indicate to the sender SN1 that sending has stopped thereby completing the terminating portion of the call for the register-sender group.

D. ALTERNATIVE EMBODIMENT

Referring now to FIG. 16, to show a more general and more basic form of the invention, an alternative embodiment for the memory layout and matrix gating arrangement is shown in simplified form, comprising logic gates 1601–4, 1611–14, and 1621–53 with the associated logic gates 1660–68 and 1670–74. This gating arrangement allows the memory to be accessed with a minimum number of logic gates. This arrangement accesses positions B–I for rows 3–6 with the positions being selected via decode logic 1600A together with flip-flops SS1, SS2, and SS4 by any TY signal that corresponds to the rows of the memory to be accessed.

OR gate 1660 enables all of the coincidence gates 1661–8 during any one of time slot signals TY3–6. Therefore, in the absence of a skip digit or an end-of-send signal, each position in a row is sequentially accessed due to flip-flops SS1, 2 and 4, and thence to the next row as designated by flip-flops SS8 and 16. Therefore, a saving in logic gates is achieved due to the fact that the AND gates 1661–8 are enabled during any of the sub-time slots associated with the rows to be accessed. Also, if every row in the memory is to be accessed, the TY signals do not have to be associated with AND gates 1661–68, which would provide a further savings in logic apparatus.

This arrangement also groups the SS flip-flops into two distinct groups and is arranged as shown in the following table:

| | TY6 | TY4 | TY3 | TY5 | SS1 | SS2 | SS4 |
|---|---|---|---|---|---|---|---|
| SS8 | 0 | 1 | 0 | 1 | | | |
| SS16 | 0 | 0 | 1 | 1 | | | |
| | S0 | S8 | S16 | S24 | 0 | 0 | 0 |
| | S1 | S9 | S17 | S25 | 1 | 0 | 0 |
| | S2 | S10 | S18 | S26 | 0 | 1 | 0 |
| | S3 | S11 | S19 | S27 | 1 | 1 | 0 |
| | S4 | S12 | S20 | S28 | 0 | 0 | 1 |
| | S5 | S13 | S21 | S29 | 1 | 0 | 1 |
| | S6 | S14 | S22 | S30 | 0 | 1 | 1 |
| | S7 | S15 | S23 | S31 | 1 | 1 | 1 |

While I have described above the principles of my invention in connection with specific apparatus, it is to be clearly understood that this description is made only by way of example and not as a limitation to the scope of my invention.

Patent No. 3,170,041 for a Communication Switching System by K. K. Spellnes issued February 16, 1965, in columns 33 and 34 thereof includes a list of copending applications relating to the same system and owned by the same assignee. That list is hereby made a part hereof as though fully set forth.

Alternate route selection in this system is done by the group selector without receiving any additional routing digits. The routing digits and control information required for any possible route are supplied by the translator and stored in the register before any sending commences. The arrangement in the group selector marker to select an alternate route and to return an alternate route digit corresponding thereto to the sender for forwarding to the register for storage is claimed in a copending patent application by W. B. Klees and W. R. Wedmore for Arrangements In a Communication Switching System, Serial No. 414,174 filed November 27, 1964. The sender control arrangement which responds to this alternate route digit to modify the mode and skip digits to provide the proper sending for the route chosen is claimed herein. The arrangement in the sender for sending in a plurality of modes is claimed in an application by B. Sherstiuk for Sender Including Pulse Generator For Digital Communication Switching Signals, Serial No. 280,053, now Patent No. 3,278,691 granted October 11, 1966. The arrangement providing two-way data transmission between the senders and the markers which permits processing information including the alternate route digit to be returned from the markers is claimed in an application by B. Sherstiuk for Sender Apparatus and Supervisory Apparatus In A Unit Connecting Registers and Senders To The Switching Network, Serial No. 304,827, now Patent No. 3,278,693, granted October 11, 1966.

The arrangement of gates in the sender controller for selecting digits from particular rows and positions of the memory and supplying them to the sender is claimed in application Serial No. 330,730 by H. L. Wirsing and B. Sherstiuk for a Matrix Gating Arrangement For a Register-Sender, filed December 16, 1963.

What is claimed is:

1. A sender control arrangement for a communication switching system which comprises switching units which include switching control apparatus for extending connections between calling and called lines, some of said lines being outgoing trunk lines, register apparatus comprising a plurality of registers, a plurality of senders less in number than the number of said registers, directory number translating apparatus common to said registers, means accessible over some of said switching units and operated upon the receipt of a call request for seizing one of said registers and transmitting the called party directory number digits thereto for storage therein, a data transmission arrangement for connecting said translating apparatus to said register apparatus to enable said translating apparatus to receive at least part of said called line directory number digits from said seized register and return routing digits and control information to the register for storage, means to then individually assign one of said senders to the seized register and to provide a connection between said register and said sender for supplying digits from the register to the sender; a two-way sending data transmission arrangement connecting the sender to further switching units for sending of routing digits and the return of processing digits, wherein responsive to routing digits designating an outgoing call the switching unit selects an outgoing trunk line and extends a connection thereto from the sender, the trunk line being selected from a plurality of sets including a primary route set and at least one alternate route set;
   said sender control arrangement comprising means including sender control apparatus to select from the routing digits and directory number digits stored in the register said digits which are supplied via said register-to-sender connection to the sender and also to supply control signals to the sender in accordance with the control information stored in the register, means to forward certain of said processing digits via the register-to-sender connection and to store them in the register, one of the processing digits being an alternate route digit when required,
   and means in the register apparatus responsive to the storage of an alternate route digit to modify said control information stored in the register in accordance with the value of the alternate route digit, so that the selection of digits and the supply of control signals from the register via the sender control apparatus to the sender corresponds to that required for the route via the selected outgoing trunk line.

2. In a communication switching system, the combination as claimed in claim 1, in which said two-way sending data transmission arrangement provides a local mode for sending routing digits to the local switching units to extend connections to outgoing trunk lines or local called lines, and said senders include arrangements for outgoing sending alternatively in a dial-pulse mode and a multifrequency mode;
   wherein said sender control arrangement includes means in said register apparatus and said sender control apparatus to store sender sequence state information providing specific states for supplying digits and control signals to the sender, wherein said control information returned from the translator and stored in the register includes a mode digit, a skip digit and an end-of-send digit, wherein the sender control apparatus is arranged to respond to the value of the mode digit to supply a mode signal to the sender indicating the mode in which the sender is to operate for the following digits, to respond to the value of the skip digit during a designated state to change the sender sequence state to omit designated intermediate states for said selection of digits, and to respond to the value of the end-of-send digit to supply an end-of-send signal to the sender during a corresponding sequence state so that only digits preceding that state are selected;
   and wherein said means to modify the control information responsive to the storage of an alternate route digit in accordance with the value thereof comprises means to modify said mode digit and said skip digit so that the selection of digits and the modes in which they are sent corresponds to that required for the route via the selected outgoing trunk line.

3. In a communication switching system, the combination as claimed in claim 2, wherein said register apparatus and said sender control apparatus are shared on a time division basis by said registers, and said registers comprise sets of storage elements of a memory, the registers being associated with corresponding time-slot pulses from a source of recurring pulses to provide sequential access of the registers to the register apparatus and the sender·control apparatus;

wherein said means to individually assign one of said senders to the seized register and to provide a connection between the register and the sender includes a plurality of conductors connected in common from the sender control apparatus to all of the senders, sender-address means to store a sender-address digit in the memory of said register designating said sender, the sender address being used to enable multiplexing gates in the sender during the register time slot, so that said selected digits and control signals are supplied to the sender during that time slot.

4. A sender control arrangement for a communication switching system which comprises switching units which include switching control apparatus for extending connections between calling and called lines, register apparatus comprising a plurality of registers, including a memory with storage elements in columns and rows, with a given number of rows for each register, a plurality of senders less in number than the number of said registers, directory number translating apparatus common to said registers, means accessible over some of said switching units and operated upon the receipt of a call request for seizing one of said registers and transmitting the called party directory number digits thereto for storage therein, a data transmission arrangement for connecting said translating apparatus to said register apparatus to enable said translating apparatus to receive at least part of said called line directory number digits from said seized register and return routing digits and control information to the register for storage, means to then individually assign one of said senders to the seized register and to provide a connection between said register and said sender for supplying digits from the register to the sender; a sending data transmission arrangement connecting the sender to further switching units for sending of routing digits;

said sender control arrangement comprising means including sender control apparatus having means to select from the routing digits and directory number digits stored in the register said digits which are supplied via said register-to-sender connection to the sender and also having means to supply control signals to the sender in accordance with the control information stored in the register, a sender sequence state arrangement to designate a plurality of sender sequence states that selectively change state to control said digit selection, with a plurality of said states corresponding to particular digits each stored in a plurality of columns and a row of the memory, a digit being selected from the memory and supplied via the sender control apparatus to the sender during its sequence state, other sequence states being for control purposes and for supplying control signals to the sender, wherein said control information returned from the translator and stored in the register includes an end-of-send digit, wherein one of said control signals is an end-of-send signal to the sender to instruct it to stop sending, it being supplied responsive to given combinations of the values of the sequence state and the end-of-send digit in the memory.

5. In a communication switching system, the combination as claimed in claim 4, wherein said reigster apparatus and said sender control apparatus are shared on a time division multiplex division basis by said registers, the registers being associated with corresponding time-slot pulses from a source of recurring pulses to provide sequential access of the registers to the register apparatus and the sender control apparatus, with each time-slot divided into a plurality of sub time-slots by pulses from the source of recurring pulses to provide sequential access to the rows of each register during the corresponding time-slot;

wherein said means to individually assign one of said senders to the seized register and to provide a connection between the register and the sender includes a plurality of conductors connected in common from the sender control apparatus to all of the senders, sender-address means to store a sender-address digit in the memory of said register to designate said sender, the sender-address being used to enable multiplexing gates in the sender during the register time-slot, so that said selected digits and control signals are supplied to the sender during that time slot, said digits being selected from the respective rows during the corresponding sub time-slots.

6. In a communication switching system, the combination as claimed in claim 4 wherein some of said lines are outgoing trunk lines, wherein said senders are arranged to send in a local mode via said sending data transmission arrangement to the local switching units, and to send alternatively in a plurality of outgoing modes after a connection has been completed via a switching unit to an outgoing trunk line, and wherein said control information returned from the translating apparatus and stored in a register includes a mode digit designating the mode to be used for each particular sequence of digits;

wherein said means to supply control signals to the sender includes logic gates for generating mode signals for supply to the sender designating the outgoing sending modes, each mode signal being generated in response to given combinations of the sequence state and the mode digit, thereby causing digits selected in succeeding states to be sent in the corresponding mode.

7. In a communication switching system, the combination as claimed in claim 6, wherein said modes for outgoing sending include a dial pulse mode and a multifrequency mode, wherein the initial digits selected from a register and supplied to the sender are always sent in the local mode, and where there are a plurality of sequence states during which mode signals may be sent, so that one mode signal may be supplied to the sender after digits have been sent in the local mode to select the outgoing trunk line, and after a number of digits have been outpulsed another mode signal may be supplied to the sender to cause the succeeding digits to be sent in another outgoing mode, the mode signals being responsive to the same value of mode digit in different sequence states.

8. In a communication switching system, the combination as claimed in claim 6, wherein one of said outgoing modes is a multifrequency mode and one of the said mode signals generated by logic gates is a multifrequency mode signal;

wherein said sender control apparatus includes further means to generate a start digit (KP) which is supplied to the sender along with the multifrequency mode signal;

and wherein the sender control apparatus further includes means to generate a stop digit (ST) which is supplied to the sender responsive to given combinations of the values of the mode digit, the end-of-send digit and a sequence state preceding a state in which the end-of-send signal is generated.

9. In a communication switching system, the combination as claimed in claim 8, wherein another of said outgoing pulsing modes is a dial pulse mode, wherein given values of said mode digit designate that a multifrequency mode signal is to be supplied in one sequence state to cause the immediately succeeding data to be sent in multifrequency mode and a dial pulse mode signal is to be sent in a later state to cause the digits succeeding that state to be sent in dial pulse mode, and wherein one of the routing digits returned from the translator is a multifrequency stop digit (ST) which is stored in a portion of the memory selected during a sequence state for the last of the digits to be sent in multifrequency mode and preceding the state in which the dial pulse mode signal is supplied to the sender, there being no stop digit (ST) generated by the sender control apparatus for these values of the mode digit.

10. In a communication switching system, the combination as claimed in claim 6, wherein said control information returned from the translating apparatus and stored in a register includes a skip digit;

and wherein said means to supply control signals to the sender includes logic gates arranged to respond to given combinations of the value of the skip digit and sequence state to cause the sequence state to be changed to a state other than the immediately following state, so that in the selection of digits certain intermediate digits are omitted.

11. In a communication switching system, the combination as claimed in claim 10, wherein responsive to routing digits designating an outgoing call one of said switching units selects an outgoing trunk line and extends a connection thereto from the sender, the trunk line being selected from a plurality of sets including a primary route set and at least an alternate route set, there being means to return an alternate route digit from the switching unit to the register for storage therein, the digit having a value designating the digits to be selected and the mode of outpulsing for the selected outgoing trunk line;

and wherein said sender control arrangement includes mode logic gates and skip-digit logic gates which responsive to the storage of an alternate route digit respectively modify the mode digit and the skip digit portions of said control information stored in the register to selected values in accordance with the value of the alternate route digit.

12. In a communication switching system, the combination as claimed in claim 11, wherein said register apparatus and said sender control apparatus are shared on a time division multiplex division basis by said registers, the registers being associated with corresponding time-slot pulses from a source of recurring pulses to provide sequential access of the registers to the register apparatus and the sender control apparatus, with each time-slot divided into a plurality of sub time-slots by pulses from the source of recurring pulses to provide sequential access to the rows of each register during the corresponding time-slot;

wherein said means to individually assign one of said senders to the seized register and to provide a connection between the register and the sender includes a plurality of conductors connected in common from the sender control apparatus to all of the senders, sender-address means to store a sender-address digit in the memory of said register designating said sender, the sender-address being used to enable multiplexing gates in the sender during the register time-slot, so that said selected digits and control signals are supplied to the sender during that time slot, said digits being selected from the respective rows during the corresponding sub time-slots.

No references cited.

KATHLEEN H. CLAFFY, *Primary Examiner.*

WILLIAM C. COOPER, *Examiner.*